(12) United States Patent
Barbier et al.

(10) Patent No.: US 10,949,873 B2
(45) Date of Patent: *Mar. 16, 2021

(54) SYSTEM AND METHOD FOR EXECUTING AN ADVERTISING CAMPAIGN THAT INCREMENTALLY REACHES UNEXPOSED TARGET VIEWERS

(71) Applicant: Adobe Inc., San Jose, CA (US)

(72) Inventors: Antoine Barbier, San Francisco, CA (US); Greg Collison, Oakland, CA (US); Albert Lim, San Francisco, CA (US); Nikhil Belsare, Foster City, CA (US); Alexander R. Hood, Oakland, CA (US)

(73) Assignee: ADOBE INC., San Jose, CA (US)

(*) Notice: Subject to any disclaimer, the term of this patent is extended or adjusted under 35 U.S.C. 154(b) by 27 days.

This patent is subject to a terminal disclaimer.

(21) Appl. No.: 16/439,523

(22) Filed: Jun. 12, 2019

(65) Prior Publication Data
US 2019/0303964 A1 Oct. 3, 2019

Related U.S. Application Data

(63) Continuation of application No. 15/282,992, filed on Sep. 30, 2016, now Pat. No. 10,445,766.
(Continued)

(51) Int. Cl.
*G06Q 30/00* (2012.01)
*G06Q 30/02* (2012.01)
(Continued)

(52) U.S. Cl.
CPC ..... *G06Q 30/0244* (2013.01); *G06Q 30/0275* (2013.01); *H04N 21/2407* (2013.01); *H04N 21/812* (2013.01)

(58) Field of Classification Search
CPC .......... G06Q 30/0244; G06Q 30/0275; H04N 21/2407; H04N 21/812
See application file for complete search history.

(56) References Cited

U.S. PATENT DOCUMENTS 8,973,023 B1 * 3/2015 Rao .................. H04N 21/25891
725/14
9,846,682 B1 * 12/2017 Righetto ............... G06F 40/106
(Continued)

OTHER PUBLICATIONS

Bagherjeiran; Large-Scale Customized Models for Advertisers; 2010 IEEE; 2010; pp. 1029-1036.*
(Continued)

*Primary Examiner* — Radu Andrei
(74) *Attorney, Agent, or Firm* — Keller Jolley Preece

(57) ABSTRACT

Systems and methods are disclosed for enabling incremental reach for an advertising campaign, across multiple screens/channels. In some embodiments, a base TV/media plan is uploaded, and targeted exposed viewers are monitored. Unexposed target viewers are identified. Additional media channels that unexposed viewers use are found. Unexposed viewers are matched with pricing and media avails from one or more media directories. Media avails are then analyzed along with incremental on-target impressions. Targeted avails for unexposed viewers are then determined, based on lowest incremental cost and largest incremental reach are added to a current cross-screen plan. An analysis to find new unexposed viewers is then re-run to determine the next-most cost effective avails. The above steps are repeated or looped until a selected advertisement budget has been allocated. User interface embodiments for these methods are also disclosed.

20 Claims, 20 Drawing Sheets

Related U.S. Application Data

(60) Provisional application No. 62/236,605, filed on Oct. 2, 2015.

(51) Int. Cl.
  *H04N 21/81* (2011.01)
  *H04N 21/24* (2011.01)

(56) References Cited

U.S. PATENT DOCUMENTS

| | | | | |
|---|---|---|---|---|
| 2009/0307061 A1* | 12/2009 | Monighetti | ............ | H04N 7/173 705/50 |
| 2009/0307084 A1* | 12/2009 | Monighetti | ........ | G06Q 30/0246 705/14.45 |
| 2013/0205339 A1* | 8/2013 | Haberman | ......... | H04N 21/8456 725/35 |
| 2014/0196062 A1* | 7/2014 | Emans | ............... | G06Q 30/0241 725/1 |
| 2014/0196081 A1* | 7/2014 | Emans | ............... | G06Q 30/0244 725/32 |
| 2014/0278912 A1* | 9/2014 | Hughes | .............. | G06O 30/0242 705/14.41 |
| 2014/0278938 A1* | 9/2014 | Hughes | .............. | G06Q 30/0246 705/14.45 |
| 2014/0289017 A1* | 9/2014 | Trenkle | ............ | G06Q 10/06375 705/7.33 |
| 2016/0119689 A1* | 4/2016 | Hood | ................ | H04N 21/44204 725/14 |
| 2017/0083935 A1* | 3/2017 | Maughan | ........... | G06Q 30/0244 |
| 2017/0085962 A1* | 3/2017 | Maughan | ........... | H04N 21/4532 |
| 2017/0316454 A1* | 11/2017 | McConnell | ........ | G06Q 30/0245 |

OTHER PUBLICATIONS

Kitts; A Comparison of Algorithms for TV Ad Targeting; 2014 IEEE; 2014; pp. 296-305.*
U.S. Appl. No. 15/282,987, dated Nov. 5, 2018, Office Action.
U.S. Appl. No. 15/282,987, dated Mar. 15, 2019, Notice of Allowance.
Brendan Kitts; A Comparison of Algorithms; 2014 IEEE; p. 298-305; 2014.
Suhrid Balakrishnan; Computational Television Advertising; 2012 IEEE; p. 72-80, 2012.
U.S. Appl. No. 15/282,992, dated Nov. 20, 2018, Office Action.
U.S. Appl. No. 15/282,992, dated Mar. 13, 2019, Notice of Allowance.

* cited by examiner

| Screen | Media Property | Avails | OT CPM | Incr. Factor | Screen Uniqueness Factor | Revisited Incr. Factor | Incr. OT CPM | Budget | Relative Incr. Reach |
|---|---|---|---|---|---|---|---|---|---|
| PTV | PTV 40 | 10,000,000 | $30 | 15% | 65% | | $100 | $3k | NA |
| | | | | | | | | | NA |
| | | | | | | | | | NA |
| | | | | | | | | | NA |
| ... | ... | ... | ... | ... | ... | | ... | ... | NA |
| PTV | PTV 3 | 5,000,000 | $20 | 2% | 70% | | $500 | $10k | NA |
| | | | | | | | | | NA |

*Fig. 2B*

| Screen | Media Property | Avails | OT CPM | Incr. Factor | Screen Uniqueness Factor | Revisited Incr. Factor | Incr. OT CPM | Budget | Relative Incr. Reach |
|---|---|---|---|---|---|---|---|---|---|
| Desktop | Site 599 | 10,000,000 | $30 | 20% | 100% | | $90 | $4k | NA |
| | | | | | | | | | NA |
| | | | | | | | | | NA |
| | | | | | | | | | NA |
| ... | ... | ... | ... | ... | ... | | ... | ... | NA |
| Desktop | Site 599 | 5,000,000 | $20 | 10% | 100% | | $300 | $8k | NA |
| | | | | | | | | | NA |

| Screen | Media Property | Avails | OT CPM | Incr. Factor | Screen Uniqueness Factor | Revisited Incr. Factor | Incr. OT CPM | Budget | Relative Incr. Reach |
|---|---|---|---|---|---|---|---|---|---|
| PTV | Site 599 | 10,000,000 | $30 | 20% | 80% | | $90 | $4k | NA |
| | PTV 40 | 10,000,000 | $30 | 15% | 65% | | $100 | $5k | NA |
| | | | | | | | | | NA |
| | | | | | | | | | NA |
| ... | ... | ... | ... | ... | ... | | ... | ... | NA |
| Desktop | Site 3099 | 5,000,000 | $20 | 10% | 80% | | $300 | $8k | NA |
| PTV | PTV 3 | 5,000,000 | $20 | 2% | 70% | | $500 | $10k | NA |

Fig. 2E

| Screen | Media Property | Avails | OT CPM | Incr. Factor | Screen Uniqueness Factor | Incr. OT CPM | Budget | Relative Incr. Reach | Incr. Reach |
|---|---|---|---|---|---|---|---|---|---|
| Desktop | Site 599 | 10,000,000 | $30 | 20% | 80% | $90 | $4k | NA | 200k |
| Desktop | Site 3099 | 5,000,000 | $20 | 10% | 80% | $300 | $8k | 0.55% | 90k |
| PTV | PTV 40 | 10,000,000 | $30 | 15% | 65% | $100 | $5k | 0.49% | 70k |
| ... | ... | ... | ... | ... | ... | ... | ... | ... | ... |
| PTV | PTV 3 | 5,000,000 | $20 | 2% | 70% | $500 | $10k | 0.05% | 4k |

Property 1

Fig. 2F

| Screen | Media Property | Avails | OT CPM | Incr. Factor | Screen Uniqueness Factor | Incr. OT CPM | Budget | Relative Incr. Reach | Incr. Reach |
|---|---|---|---|---|---|---|---|---|---|
| Desktop | Site 599 | 10,000,000 | $30 | 20% | 80% | $90 | $4k | NA | 200k |
| Desktop | Site 3099 | 5,000,000 | $20 | 10% | 80% | $300 | $8k | 0.55% | 90k |
| PTV | PTV 40 | 10,000,000 | $30 | 15% | 65% | $100 | $5k | 0.49% | 70k |
| ... | ... | ... | ... | ... | ... | ... | ... | ... | ... |
| PTV | PTV 3 | 5,000,000 | $20 | 2% | 70% | $500 | $10k | 0.05% | 4k |

Property 1, Property 2

Fig. 2G

| Screen | Media Property | Avails | OT CPM | Incr. Factor | Screen Uniqueness Factor | Incr. OT CPM | Budget | Relative Incr. Reach | Incr. Reach |
|---|---|---|---|---|---|---|---|---|---|
| Desktop | Site 599 | 10,000,000 | $30 | 20% | 80% | $90 | $4k | NA | 200k |
| Desktop | Site 3099 | 5,000,000 | $20 | 10% | 80% | $300 | $8k | 0.55% | 90k |
| PTV | PTV 40 | 10,000,000 | $30 | 15% | 65% | $100 | $5k | 0.49% | 70k |
| ... | ... | ... | ... | ... | ... | ... | ... | ... | ... |
| PTV | PTV 3 | 5,000,000 | $20 | 2% | 70% | $500 | $10k | 0.05% | 4k |

Property 1, Property 2, Property n

| Screen | Media Property | Avails | OT CPM | Budget |
|---|---|---|---|---|
| Phone | App 1 | 10,000,000 | $9 | $50k |
| Phone | App 2 | 1,000,000 | $10 | $10k |
| Tablet | App 3 | 1,000,000 | $11 | $3k |
| Tablet | App 4 | 1,000,000 | $12 | $5k |
| ... | ... | ... | ... | ... |
| Phone | App 5 | 5,000,000 | $30 | $10k |

*Fig. 2H*

| Screen | Media Property | Avails | OT CPM | Screen Uniqueness Factor | Incr. OT CPM | Budget | Relative Incr. Reach |
|---|---|---|---|---|---|---|---|
| PTV | PTV 40 | 10,000,000 | $30 | 65% | $100 | $5k | NA |
| ... | ... | ... | ... | ... | ... | ... | NA |
| ... | ... | ... | ... | ... | ... | ... | NA |
| ... | ... | ... | ... | ... | ... | ... | NA |
| PTV | PTV 3 | 5,000,000 | $20 | 70% | $500 | $10k | NA |

| Screen | Media Property | Avails | OT CPM | Screen Uniqueness Factor | Incr. OT CPM | Budget | Relative Incr. Reach |
|---|---|---|---|---|---|---|---|
| Desktop | Site 599 | 10,000,000 | $30 | 100% | $90 | $4k | NA |
| ... | ... | ... | ... | ... | ... | ... | NA |
| ... | ... | ... | ... | ... | ... | ... | NA |
| ... | ... | ... | ... | ... | ... | ... | NA |
| Desktop | Site 3099 | 5,000,000 | $20 | 100% | $300 | $8k | NA |

Fig. 2K

| Screen | Media Property | Avails | OT CPM | Screen Uniqueness Factor | Incr. OT CPM | Budget | Relative Incr. Reach |
|---|---|---|---|---|---|---|---|
| Desktop | Site 599 | 10,000,000 | $30 | 100% | $30 | $4k | NA |
| PTV | PTV 40 | 10,000,000 | $30 | 65% | $45 | $5k | NA |
| Desktop | Site 893 | 2,000,000 | $46 | 100% | $46 | $2k | NA |
| PTV | PTV 21 | 12,000,000 | $4 | 50% | $80 | $6k | NA |
| ... | ... | ... | ... | ... | ... | ... | NA |
| Desktop | Site 3099 | 5,000,000 | $20 | 100% | $300 | $8k | NA |

| Screen | Media Property | Avails | OT CPM | Screen Uniqueness Factor | Incr. OT CPM | Budget | Relative Incr. Reach | Incr. Reach |
|---|---|---|---|---|---|---|---|---|
| Desktop | Site 599 | 10,000,000 | $30 | 80% | $8 | $4k | NA | 200k |
| Desktop | Site 3099 | 5,000,000 | $20 | 80% | $10 | $8k | 100% | 90k |
| PTV | PTV 40 | 10,000,000 | $30 | 65% | $11 | $5k | 100% | 100k |
| ... | ... | ... | ... | ... | ... | ... | ... | ... |
| PTV | Site 3 | 5,000,000 | $20 | 70% | $45 | $10k | 90% | 5k |

*Fig. 2L*

| Screen | Media Property | Avails | OT CPM | Budget |
|---|---|---|---|---|
| Phone | App 1 | 10,000,000 | $9 | $50k |
| Phone | App 2 | 1,000,000 | $10 | $10k |
| Tablet | App 3 | 1,000,000 | $11 | $3k |
| Tablet | App 4 | 1,000,000 | $12 | $5k |
| ... | ... | ... | ... | ... |
| Phone | App 5 | 5,000,000 | $30 | $10k |

*Fig. 2M*

302 — Cross Screen Planning

Campaign Goals

Region -Select- — 304
Budget $ Enter Budget — 306
Run Dates mm/dd/yyyy to mm/dd/yyyy — 310
308

Demo Targeting 312
314 — Gender ● Both ○ Both ○ Both       318
316 — Age   13+ yrs  |13 17 20 24 34 39 44 49 54 64 +|

Strategic Targeting (Optional)

320
322 — Nielsen Targets   Information guidance about this goes here.
                       Choose Targets 324 — MRI Segments   Information guidance about this goes here.
                    Choose Segments 326 — TV Plan Analysis (Optional)

Upload Existing Plan  To create a tv plan using existing plans, select from the options below.
328 — ● None  ○ Using Historic Nielsen Data  ○ Using Template    Open Existing Plan

NEXT

SYSTEM AND METHOD FOR EXECUTING AN ADVERTISING CAMPAIGN THAT INCREMENTALLY REACHES UNEXPOSED TARGET VIEWERS

CROSS-REFERENCE TO RELATED APPLICATIONS

This application is a continuation of U.S. patent application Ser. No. 15/282,992, filed Sep. 30, 2016, which claims the benefit pursuant to 35 U.S.C. 119(e) of U.S. Provisional Application No. 62/236,605, filed Oct. 2, 2015. The aforementioned applications are hereby incorporated by reference in their entirety.

This application also specifically incorporates, in its entirety, by reference U.S. application Ser. No. 14/923,153 filed Oct. 26, 2015 and U.S. application Ser. No. 14/716,737 filed May 19, 2015.

FIELD

An embodiment of the invention relates generally to systems and methods for executing an advertising campaign that incrementally reaches unexposed target viewers. The present invention also relates generally to systems and methods for planning and managing advertising campaigns that deliver impressions across diverse platforms.

BACKGROUND

Multi-channel marketing with cross-screen advertising campaigns may be described as the practice of using multiple advertising channels to reach target customers/viewers. In addition to allowing businesses to reach customers through different mediums, multi-channel marketing also makes it easy for customers to complete desired conversions on whatever medium they are most comfortable with. There is a large assortment of marketing channels, meaning that potential customers could be anywhere, and a conventional TV campaign may leave many desirable viewers unexposed to an advertiser's message. It is therefore desirable for an advertiser to reach customers or viewers through at least a second channel where their advertising campaign through a first channel failed to reach them.

In the RTB (Real-Time Bidding) environment for media impression auctions and purchases, an electronic advertising agency or consolidator operating a demand-side platform traditionally receives billions of daily auction opportunities for electronic media impressions from partners like Google®, Yahoo®, etc., and bids for the impression opportunities on behalf of client or advertisers. Recently, a need has arisen for demand-side platforms to offer planning and execution for cross-platform campaigns (supporting traditional TV and digital media), as well as advertising campaigns that support traditional TV advertising (or ad) impressions. When planning cross platform campaigns, the demand-side platform can offer improved targeting and efficiencies as a result of improved developing, planning and analysis tools for enhanced digital media campaigns.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings:

FIGS. 2B-2M illustrate exemplary results displayed as outputs in accordance with one embodiment.

FIGS. 3-10 illustrate screen shot examples of a user interface that may be used with the system for executing an advertising campaign that incrementally reaches unexposed target viewers in accordance with one embodiment.

DETAILED DESCRIPTION

Figure 1:
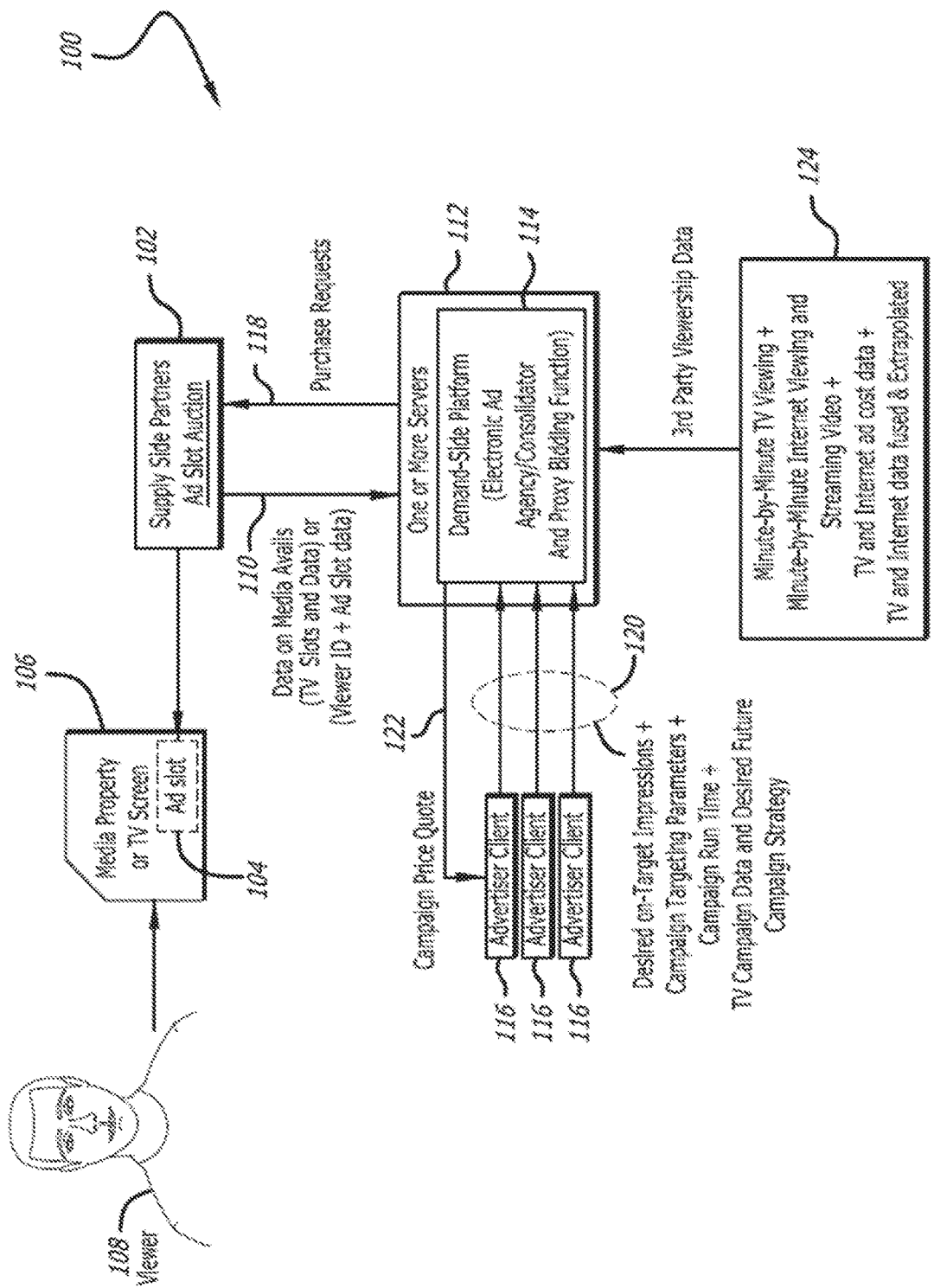
FIG. 1 illustrates a block diagram of a system for executing an advertising campaign that incrementally reaches unexposed target viewers in accordance with one embodiment.

In the following description, numerous specific details are set forth. However, it is understood that embodiments of the invention may be practiced without these specific details. In other instances, well-known circuits, structures, and techniques have not been shown to avoid obscuring the understanding of this description.

Some of the terms or abbreviations used throughout the following description are herein defined as follows:

| Terms or abbreviations | Definitions and explanations |
|---|---|
| Media avails or "avails" | Unsold units of time available for broadcasters to sell to advertisers or the number of impressions available for purchase on a daily or monthly basis for a given media property. |
| TV Base Plan | A TV advertising campaign that has already run and where historical viewer information is available. |
| On-Target Cost-per-Impression (OT CPM) | Cost-per-Impression (per 1,000 impressions) for on-target impressions. |
| Incremental reach | Viewers reached (by the invention) that were not reached by the TV Base Plan. |
| Nielsen | An exemplary third party provider of viewership data and related tools |
| NPN | A source of third party data such as Nielsen's National People Meter |
| PTV | Programmatic television (TV) |
| Linear TV | Conventional time-and-channel-based TV |
| CPM | Cost per 1,000 impressions |
| VOD | Video on Demand |
| MVPD | Multichannel Video Programming Distributor |
| Xscreen or Cross-Screen | Campaigns that target multiple different types of screens including, for example, TV, desktop, tablet, smartphone, etc. |

-continued

| Terms or abbreviations | Definitions and explanations |
|---|---|
| Demo, Demographic, and Demo Targeting | Targeting a traditional demographic segment such as age and gender. |
| Strategic Targeting or Strategic Segment Targeting | Targeting directed to a strategic segment which is a segment other than demographic segments. For example, a strategic segment targeting can include targeting directed towards at least one of: buying behavior, income, ethnicity, education, children, home, automobile (auto), or pets. |
| Media Property, "MP", or "Property" | Any screen type where an advertisement may be displayed including, for example, an online Webpage, online video, traditional broadcast TV, an electronic billboard, or a connected wristwatch. |
| Daypart | Portions of a day where media may be viewed. |
| BrandPoint | Example of a system used by a Demand-Side Platform for planning and executing advertising campaigns including profiling viewers and Media Properties as well as recording and providing a source of data from previous advertising campaigns. |
| Fusion | A source of third party data (e.g., Nielsen) that merges multiple diverse datasets of viewership information into a single database, generally referred to as a fused database. As used herein, this typically refers to a database containing viewership data for both traditional TV viewing and online viewing. |
| DSP | Demand Side Platform |
| KPI | Key Performance Indicator |
| Comscore | An exemplary third party provider of data regarding advertising campaigns |
| DOOH | Digital Out-Of-Home advertising |

Methods and systems for executing an advertising campaign that incrementally reaches unexposed target viewers are described herein. Specifically, systems and methods are disclosed for enabling incremental reach for an advertising campaign, across multiple channels. In some embodiments, a base TV or media plan is uploaded, and targeted exposed viewers are monitored. Unexposed target viewers also are identified and additional media channels that unexposed viewers use are found and identified. Unexposed viewers are then matched with pricing and media avails from one or more media directories. Media avails are then analyzed along with incremental on-target impressions. Targeted avails for unexposed viewers are then determined, based on lowest incremental cost and are added to a current cross-screen plan. An analysis to find new unexposed viewers is then re-run to determine the next-most cost effective avails. The above steps are repeated or looped until a selected advertisement budget has been allocated.

In one embodiment, a computer-readable storage medium having stored thereon instructions which when executed by one or more processors, cause the processors to perform a computerized process for executing an advertising campaign that incrementally reaches unexposed target viewers. The computerized process may request or receive user guidance or input. The one or more processors may be implemented as one or more servers that may be co-located, or alternately located at remote locations or servers, or located in the Cloud. The "Cloud" typically refers to computers, processors, or servers located at remote locations where their use is typically provided as a service (e.g., Infrastructure as a Service).

FIG. 1 illustrates a block diagram of a system 100 for executing an advertising campaign that incrementally reaches unexposed target viewers in accordance with one embodiment. In FIG. 1, the system 100 includes a demand-side platform (DSP) 114 that interacts via a network (e.g., the Internet) with advertiser or clients 116 on a electronic devices or servers, supply side partners (SSP) 102 on a SSP server, and sources 124 of third party viewership data. As shown in FIG. 1, the DSP 114 may be included on one or more servers and may include one or more processors 112. A DSP 114 utilizes automation software operating on one or more servers or processors 112 to bid for ad slots 104 to be displayed or shown to viewers 108 via media property or TV programming 106. Online advertising or TV programming supply side partner 102 typically provides a sale opportunity or bid request package 110 which may include ad slot data to the DSP 114. The supply side partners 102 may be a server that is external to the DSP 114. The DSP 114 will, if appropriate, provide a response 118 to supply side partner 102. That response may include a bid and either an advertisement or information describing an advertisement. The sources 124 of third party viewership data may be a database containing a TV base plan. The sources 124 may also include a fused database and one or more additional databases. The fused database may include a list of viewers and historical data for TV viewing and online viewing related to the list of viewers. The one or more additional databases may include historical data for online viewing related to viewers not included in the list of viewers in the fused database.

It is important to note that from the time that a bid request package is issued, a DSP 114 must supply a bid response to the supply side partner 102 within a fixed time period. Any bid response not received within that time period is ignored. As such, the processes described herein for execution of a campaign are extremely time-sensitive.

Given the quantity and complexity of the data and tasks involved in operating embodiments of the invention, one or more sequential machines (e.g., sequential processes operating on one or more processors) and a hardware communications infrastructure to communicate with a network (e.g., the Internet) are needed.

In embodiments of the invention, the methods for executing an advertising campaign that incrementally reaches unexposed target viewers include analysis and consideration of millions of data elements which requires and inextricably ties the embodiments of the invention to machine. For most supply-side partners 102, a Demand Side Platform (DSP) 114 must both analyze and respond with a bid to a received ad slot opportunity in less than 200 milliseconds, or the bid will be ignored. Therefore, embodiments of the present invention include placing a bidding response 118 through the Internet to a supply side partner 102 operating on a remote server within 200 milliseconds (200 mS) of receiving the ad slot opportunity 110.

Performing the claimed processes with "pencil and paper" is impossible for many reasons, as is performing the process without the Internet. In fact, this process could not be performed within the specified time constraint regardless of the number of humans involved, were it not a computerized process. The entire process with respect to online advertisements requires an intimate usage of the Internet for the DSP 114 to communicate with: supply-side platforms; advertising exchanges; advertising networks; and attribution partners. The DSP 114 must receive bid request packages, place bids, and supply the ads themselves in milliseconds via the Internet. Then, after a campaign has run, the DSP 114 automatically receives attribution data from attribution partners. The preceding description names only some of the automated processes and actions involved in implementing the invention as claimed.

Upon receiving the ad slot opportunity 110 (e.g., a bid request package that includes data on media avails (such as TV slots and data or viewer identification (ID) and ad slot data), the DSP 114 which may include a software running on the one or more servers 112 to determine whether to bid and how much to bid either automatically or semi-automatically using (and processing) information 120 supplied by client or advertiser 116. Such information may include for example: desired on-target impressions, campaign targeting parameters, campaign runtime, campaign budget, maximum bid, and TV campaign data and desired campaign strategy. During the campaign planning stage, the DSP 114 provides campaign cost estimates 122 and estimates for results to advertiser or clients 116. In some embodiments, the DSP 114 thus plans and executes a new plan including an online campaign that provides incremental reach beyond that of a TV base plan.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 2A:
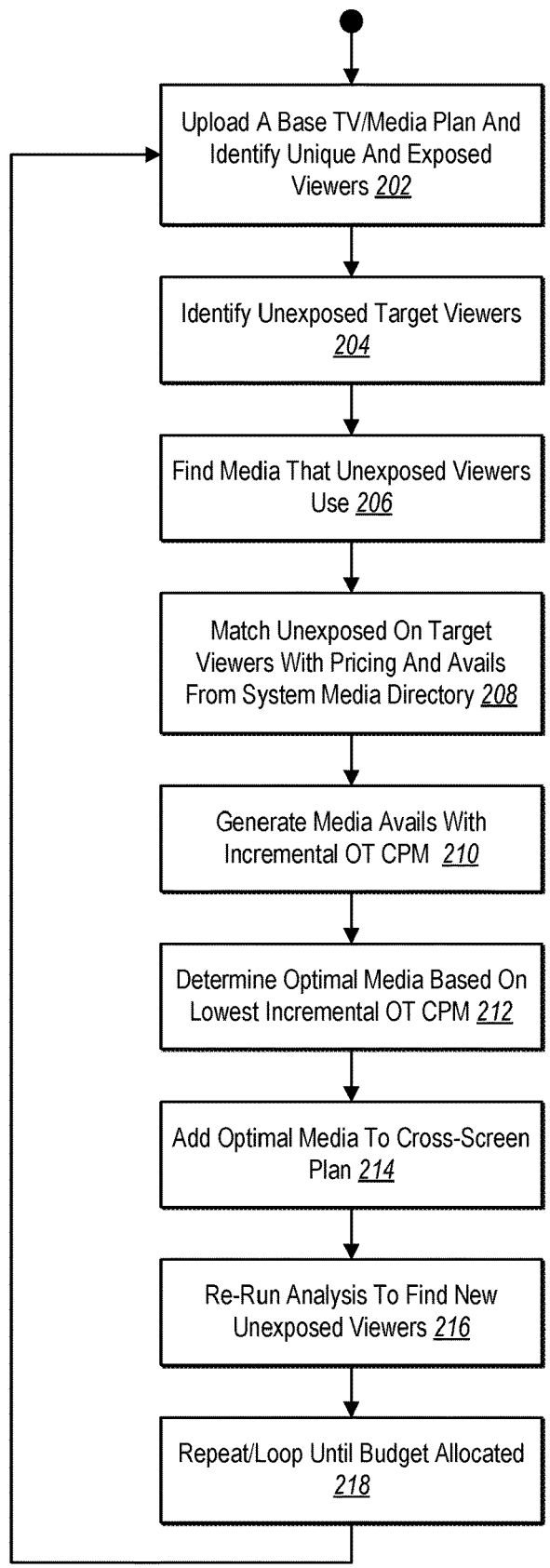
FIG. 2A illustrates a flowchart of a method for executing an advertising campaign that incrementally reaches unexposed target viewers in accordance with one embodiment.

FIG. 2A illustrates a flowchart of a method for executing an advertising campaign that incrementally reaches unexposed target viewers in accordance with one embodiment. The method in FIG. 2A starts at step 202 with the DSP 114 receiving an uploaded a base TV or media plan, and identifying exposed unique viewers. In one embodiment, step 202 further includes translating the media plan to a format consistent with a third party historical data. At step 204, the DSP 114 identifies unexposed target viewers. In one embodiment, the DSP 114 uses a third party data provider such as Nielsen's "National People Meter" (NPN) to identify unexposed target viewers. At step 206, the DSP 114 identifies or finds additional media channels that unexposed viewers use. In one embodiment, a third party data provider may be used to identify the additional channels in step 206. At step 208, the DSP 114 matches the unexposed on target viewers with pricing and avails from supply side partners 102. At step 210, the DSP 114 generates media avails with incremental OT cost per 1,000 impressions (CPM). At step 212, the DSP 114 determines optimal media based on lowest incremental OT CPM. At step 214, the DSP 114 adds optimal media to a current cross-screen plan. At step 216, the DSP 114 re-runs an analysis to find new unexposed viewers. At step 218, the DSP 114 may repeat or loop the above steps, with the next-most cost effective media found during each cycle of the loop, until a selected advertisement budget has been allocated.

In accordance with further exemplary embodiments of the invention, various use cases may be implemented, including the use cases included in the tables below. As shown in the Tables below, the inputs and the outputs of the DSP 114 are delineated and the high level methodology as well as the process performed by the DSP 114 to build the Xscreen plan are delineated.

| Use Case 1: Extend (Uploaded) TV Base Plan | |
|---|---|
| Inputs: | (Incremental) Budget, Start and End Dates, Demographic and strategic target |
| Outputs: | Property list (Media Property or MP List) which is a combination of TV Network/Day/Daypart (PTV), Desktop Site, Phone and Tablet Applications Incremental reach percentage (%) (complementing the TV Base Plan) Unduplicated reach (considering TV Base Plan, PTV, Desktop, Phone, Tablet) which is the number of unique viewers reached by the combination of the TV base plan, plus the portion planned by DSPs such as TubeMogul. |
| High level methodology: | 1. A fixed % of a campaign budget is assigned to PTV and Desktop versus Phone and Tablet. This % of budget varies based on the Target Demo.<br>2. A process according to the invention starts by identifying the property (TV Network/Day/Daypart or Desktop Site) list which generates the highest incremental reach for the % of budget going to PTV and Desktop.<br>3. Next the process builds the Phone and Tablet App list generating the least expensive On-Target % for the target demo considering the % of budget going to Phone and Tablet. |
| Building the XScreen plan | 1. Building the TV Network/Day/Daypart or Desktop Site list which generates the highest incremental reach for the % of budget going to PTV and Desktop:<br>a. Upload a TV Plan and extract a list of TV Network/Day/Daypart<br>b. Assuming the TV plan is a prospective plan, the invention "translates" the TV plan into historical data in order to use the NPM and Monitor Plus data. For example, the invention may examine the Nielsen dataset for the latest four available weeks and uses that as the basis for the analysis. Other datasets may also be used.<br>c. From a dataset such as for example the Monitor Plus/NPM dataset, the list of Household number/Person ID who would have been exposed the TV campaign is identified. This is the Total exposed unique viewers.<br>d. From this list, using the demo data from NPM, the invention identifies the on-target exposed unique viewers, i.e. the list of Household number/Person ID who would have been exposed and are within the target demo.<br>e. Looking at the overall Nielsen panel for the 4 week period, the list of Household number/Person ID who would not have been exposed to the TV campaign is identified. This is the Total unexposed unique viewers.<br>f. From this list, using the demo data from NPM, the invention identifies the on-target unexposed unique viewers, i.e. the list of Household number/Person ID who would have not been exposed and are within the target demo.<br>Using NPM/Monitor Plus data, the list of TV Network/Day/Daypart watched by the on-target unexposed unique viewers is identified.<br>For each TV Network/Day/Daypart, the invention retrieves from the PTV planning tool, for example, the following metrics:<br>i. Avails (for the campaign dates),<br>ii. OT CPM,<br>iii. OT %<br>For each TV Network/Day/Daypart, the invention builds the following metrics from the Nielsen panel analysis, or other relevant dataset:<br>iv. Incremental Factor: It is a % reflecting the probability to reach an unexposed user by advertising on a given site or TV Network on a given day at a given time. This is also the total number of unexposed on-target unique viewers/ total number of unique viewers from the overall panel. |

| Use Case 1: Extend (Uploaded) TV Base Plan | |
|---|---|
| | For each TV Network/Day/Daypart, the invention retrieves the "uniqueness screen factor" which is a factor reflecting for example that it is harder to generate unique reach on TV versus Desktop based on the campaign duration. The longer the campaign is, the harder it is to generate unduplicated reach on TV.<br>v. Uniqueness Screen Factor: value is a % value (average of the values for the period of time matching the campaign duration).<br>For each TV Network/Day/Daypart, the following factors are calculated:<br>vi. Incremental OT CPM = OT CPM/(Incremental Factor * Uniqueness Screen Factor)<br>vii. Budget = OT % * Avails * OT CPM/1,000 = (OT % * Avails * OT CPM) * 0.001 |

The result is a list of TV Network/Day/Daypart ordered by ascending incremental ("Incr.") OT CPM. In some embodiments, the DSP 114 signals to a display device to generate the result as a displayed output. FIG. 2B illustrates an exemplary result in accordance with one embodiment.

Using Fusion data, the list of sites visited by the on-target unexposed unique viewers is identified and this list is completed using all the sites registered in the system, for example, in the BrandPoint system, which do not have a match within the Fusion data, i.e. the sites in BrandPoint which have not been visited by either the exposed or unexposed on-target viewers. For each site, the invention retrieves from the system, for example the BrandPoint tool, the following metrics: i. Avails (for the campaign dates), ii. OT CPM, and iii. OT %. For each site, the following metrics from the Nielsen panel analysis are built and calculated:

| Use Case 1: Extend (Uploaded) TV Base Plan (continued) | |
|---|---|
| Metrics from the Nielsen panel analysis built for each site | iv. Incremental Factor:<br>This is a % reflecting the probability to reach an unexposed user by advertising on a given site<br>It may be the total number of unexposed on-target unique viewers/total number of unique viewers from the overall panel.<br>Note: for Sites registered in BrandPoint and do not have a match in the Fusion data, an incremental factor of 80% is assumed.<br>v. Uniqueness screen factor is retrieved<br>A factor reflecting for example that it is harder to generate unique reach on TV versus Desktop based on the campaign duration (e.g., the longer the campaign is, the harder it is to generate unduplicated reach on TV)<br>Uniqueness Screen Factor is value is a % value (average of the values for the period of time matching the campaign duration).<br>Note that the Uniqueness Screen Factor will likely be a fixed value for sites (assume 100% for now). |
| Metrics calculated for each site | vi. Incremental OT CPM = OT CPM/(Incremental Factor * Uniqueness Screen Factor)<br>vii. Budget = OT % * Avails * OT CPM/1,000 |

In one embodiment, the result is a list of sites ordered by ascending incremental (Incr.) OT CPM. In some embodiments, the DSP 114 signals to a display device to generate the result as a displayed output. For example, the result may be a list of sites ordered by ascending Incremental OT CPM as shown in FIG. 2C.

In one example, the process can now merge the two lists and keep the result ordered by ascending Incremental OT CPM as shown in FIG. 2D. In some embodiments, the DSP 114 signals to a display device to generate the result as a displayed output. The result that is obtained by merging the two lists may also be truncated to include the media properties (MPs) having the lowest incremental on-target CPM costs and/or where the total of budgets associated with those MPs equals a specified percentage over the total campaign budget.

In one example, the building of the X-Screen plan of Use Case 1 is continued as follows:

| Use Case 1: Extend (Uploaded) TV Base Plan | |
|---|---|
| Building the XScreen plan | g. Next, the invention traverses the list and keeps the TV Network/Day/Dayparts and sites for which budgets add up to 200% of the campaign budget.<br>h. From there, the process in accordance with one embodiment of the invention follows a recursive approach.<br>i. Select the property (TV Network/Day/Daypart or site) with the lower incremental OT CPM (Property 1). (optionally select instead the property having the highest relative incremental reach)<br>ii. Calculate the incremental reach Property 1 would generate compared to the TV base plan. To do so, identify in the panel the on-target unique viewers who watched or visited Property 1 within the 4 week period considered for the analysis. Compare the unique reach for Property 1 (weighted on-target exposed unique viewers to the property) to the reach of the TV Base Plan. Identify the overlap of unique viewers (Household #/Person ID) between both. This overlap corresponds to the duplicated viewers. From there, identify within Property 1 unique viewers the ones not exposed to the TV Plan. The Relative Incremental Reach % is calculated as follows: ((unique viewers for Property 1) − (overlap of unique viewers between Property 1 and TV Base plan))/(total unique viewers for Property 1).<br>The actual Incremental Reach for Property 1 is calculated as follows:<br>Avails * OT % * Screen uniqueness factor * Relative Incremental Reach %<br>Note: Use the weights at the person ID level when calculating the relative incremental reach %.<br>If the property is a site which was "suggested" by the system, for example by BrandPoint, but has no match in Fusion, a fixed Relative Incremental Reach % (80%) may be optionally assumed.<br>iii. From there, the list is rebuilt of exposed/unexposed viewers from the panel for the combination of (TV Base Plan and Property 1). For each property, the invention calculates the relative incremental reach compared to the combination (similar method to previous step).<br>iv. Select the property with the highest Relative Incremental Reach % (Property 2) and rerun step iii for the combination (TV Base Plan + Property 1 + Property 2).<br>v. Continue until the whole list has been traversed.<br>vi. Traverse down the list until the sum of the budget is equal to the % of Budget dedicated to PTV + Desktop.<br>vii. Within this list, check if the sum of PTV properties can be bought from a Supply Side Partner (e.g., $50k minimum, at least 12 TV networks.)<br>In some examples, this is the final PTV and Property list. If not, restart at step (h) but only considering Desktop sites (exclude PTV properties). The final PTV and Desktop property list would only be composed of sites. |

After step h (iii), the result is a list of properties ordered by descending Relative Incremental Reach %. The $1^{st}$ row is Property 1 for which the Incremental Reach # is calculated, and is not considered for the recursive analysis. For example, the result after h (iii) may be a list of properties as illustrated in FIG. 2E.

After h (iv), the result is a list of properties ordered by descending Relative Incremental Reach %. The $1^{st}$ and $2^{nd}$ rows are Property 1 and Property 2 for which the Incremental Reach # is calculated, and is not part of the recursive analysis anymore. In one embodiment, the result after h (iv) may be a list of properties as illustrated in FIG. 2F.

After h (v), the result is a list of ranked properties. In one embodiment, the result after h (v) may be a list of properties as illustrated in FIG. 2G.

In one example, the building of the X-Screen plan of Use Case 1 is continued as follows:

| Use Case 1: Extend (Uploaded) TV Base Plan | |
|---|---|
| Building the XScreen plan | 2. Building the Phone and Tablet App list generating the least expensive On-Target % for the target demo considering the % of budget going to Phone + Tablet: a. Considering the Target demo, we get from "BrandPoint Mobile" the list of Phone and Tablet apps ordered by ascending OT CPM. b. Run down the list until the Phone and Tablet budgets are met. c. The Incremental Reach for Phone + Tablet is the Mobile Reach # * (Desktop-Mobile unduplicated reach factor based on, for example, Comscore) The Desktop-Mobile unduplicated reach factor would be per demo. As an instance, using Comscore top 100 multiplatform report unduplicated Desktop-Mobile. |

The results obtained after step 2(a) may be, for example, the list of applications as illustrated in FIG. 2H.

In one example, the Use Case 1 may also include a case when the users update the suggested media mix. Accordingly, the process according to one embodiment to address this update is as follows:

| Use Case 1: Extend (Uploaded) TV Base Plan - Use cases when users update the suggested Media Mix: | |
|---|---|
| Budget Update: | 1. User lowers budget for Phone and/or Tablet: reallocate budget tthe [PTV + Desktop] and run the full analysis. In this case, the user dictates the % Budget split. 2. User lowers budget for PTV: reallocate the budget to Desktop (subcase: all of the budget will be reallocated to Desktop if the budget left by the user for PTV is not allowing to buy the minimum block from a Supply Side Partner) 3. User lowers budget for Desktop: reallocate the budget to PTV. 4. User increases budget for PTV: reduces budget for Desktop (going down the same recursive approach until one or the other budget is met and then only consider properties from the screen with remaining budget). 5. User increases budget for Desktop: reduces budget for PTV (going down the same recursive approach until one or the other budget is met and then only consider properties from the screen with remaining budget) 6. User increases budget for Phone and/or Tablet: decreases budget for [PTV + Desktop] block redoing the recursive approach, and may end up with no PTV if the budgets to buy a block are not met. |
| Property list Update: | The principle is to redistribute the "removed" budgets within the same screen and among the existing properties by increasing the budgets allocated to them. |
| Impression Update: | Same as for a property list update, the principle is to redistribute the impressions within the same screen and among the existing properties by increasing/decreasing the budgets allocated to them. |

Another exemplary use case is discussed in the following table:

| Use Case 2: New PTV, Desktop, Phone & Tablet Plan (from scratch) | |
|---|---|
| Inputs: | Budget, Start & End Dates, and Target demographics |
| Outputs: | Property list which is a combination of TV Network/Day/DayPart (PTV), Desktop Site, Phone and Tablet Applications Unduplicated reach (considering PTV, Desktop, Phone, Tablet) |
| High-level methodology | It is similar to use case 1, the main difference being that rather than extending an existing TV plan, the process starts by ranking properties based on Incremental OT CPM and from there, follows the recursive approach. |
| Building the XScreen plan | 1. Building the TV Network/Day/Daypart or Desktop Site list which generates the highest incremental reach for the % of budget going to PTV and Desktop: a. Retrieve from the PTV planning tool the list of TV Network/Day/Daypart indexing low OT CPM for the campaign dates and the overall campaign Budget provided by the planner. For each property, the following metrics are retrieved: i. Avails (for the campaign dates) ii. OT CPM iii. OT % Note: Since this process starts from scratch, the process does not need to calculate the incremental factor as was done in use case 1. For each TV Network/Day/Daypart, the "uniqueness screen factor" is retrieved which is a factor reflecting that it is harder to generate unique reach on TV vs Desktop based on the campaign duration (e.g., the longer the campaign is, the harder it is to generate unduplicated reach on TV.) iv. Uniqueness Screen Factor: value is a % value (average of the values for the period of time matching the campaign duration) For each TV Network/Day/Daypart, the following are calculated: v. Incremental OT CPM = OT CPM/(Uniqueness Screen Factor) vi. Budget = OT % * Avails * OT CPM/1,000 = (OT % * Avails * OT CPM) * 0.001 For each property, the following metrics are retrieved: vii. Avails (for the campaign dates), viii. OT CPM, ix. OT % |

In one embodiment, the result is a list of TV Network/Day/Daypart ordered by ascending Incremental OT CPM as illustrated in FIG. 2I.

The invention then retrieves from, for example, the BrandPoint list of sites indexing low OT CPM for the campaign dates and the overall campaign Budget provided by the planner. For each property, the following metrics are retrieved: vii. Avails (for the campaign dates), viii. OT CPM, ix. OT %. Note that since this process starts from scratch, there is no need to calculate the incremental factor as was done in use case 1.

For each site, the following metrics are built and calculated:

| Use Case 2: New PTV, Desktop, Phone & Tablet Plan (from scratch) | |
|---|---|
| Metrics retrieved for each site | x. Uniqueness screen factor is retrieved A factor reflecting for example that it is harder to generate unique reach on TV versus Desktop based on the campaign duration (e.g., the longer the campaign is, the harder it is to generate unduplicated reach on TV) Uniqueness Screen Factor is value is a % value (average of the values for the period of time matching the campaign duration). Note that the Uniqueness Screen Factor will likely be a fixed value for sites (optionally assume 100%). |

-continued

| Use Case 2: New PTV, Desktop, Phone & Tablet Plan (from scratch) | |
|---|---|
| Metrics calculated for each site | xi. Incremental OT CPM = OT CPM/(Uniqueness Screen Factor)<br>xii. Budget = OT % * Avails * OT CPM/1,000 |

In one embodiment, the result is a list of sites ordered by ascending Incremental OT CPM as illustrated in FIG. 2J.

In one embodiment, the two lists are merged and the result is ordered by ascending Incremental OT CPM. The result may be as shown in FIG. 2K, for example.

In one embodiment, the building of the X-Screen plan of Use Case 2 is continued as follows:

| Use Case 2: New PTV, Desktop, Phone & Tablet Plan (from scratch) | |
|---|---|
| Building the Xscreen plan | d. Traverse down the list and keep the TV Network/Day/Dayparts and sites for which budgets add up to for example 200% of the campaign budget. Other percentages over budget may also be used for this calculation.<br>e. From there, follow a recursive approach:<br>i. Select the 1st property (TV Network/Day/Daypart or site) with the lower incremental OT CPM and call it Property 1<br>ii. Considering the Nielsen NPM and Fusion dataset, identify in the panel the on-target unique viewers who watched or visited Property 1 within the 4 week period considered for the analysis.<br>iii. For each property in the list Property n (excluding Property 1), calculate the relative incremental reach % compared to Property 1. To do so, identify in the panel the on-target unique viewers who watched or visited Property n within the 4 week period considered for the analysis. Compare the unique reach for Property n (weighted on-target exposed unique viewers to the property) to the reach of Property 1. Identify the overlap of unique viewers (Household #/Person ID) between both. This overlap corresponds to the duplicated viewers. From there, identify within Property n unique viewers not exposed to Property 1.<br>The Relative Incremental Reach % is calculated as follows: ((unique viewers for Property n) − (overlap of unique viewers between Property n and Property 1))/(total unique viewers for Property n).<br>The actual Incremental Reach for Property n is calculated as follows:<br>Avails * OT % * Screen uniqueness factor * Relative Incremental Reach %<br>Notes: Use the weights at the person ID level when calculating the relative incremental reach %.<br>If the property is a site which was "suggested" by BrandPoint but has not match in Fusion, optionally assume a fixed Relative Incremental Reach % (eg. 100%)<br>iv. Select the property with the highest Relative Incremental Reach %/Incremental OT CPM and call it Property 2. Then, rerun step iii for the combination (Property 1 + Property 2).<br>The result is a list of properties ordered by descending Relative Incremental Reach % (1) and ascending incremental OT CPM (2).<br>v. Go down the list until the sum of the budget is equal to the % of Budget dedicated to PTV and Desktop.<br>vi. Within this list, check if the sum of PTV properties can be bought from a Supply Side Partner (for example $50k minimum, at least 12 TV networks etc). If yes, this is the final PTV and Property list. If not, restart at step (h) but only considering Desktop sites (exclude PTV properties). The final PTV and Desktop property list would only be composed of sites. |

In one embodiment, the result is a list or properties ordered by descending Relative Incremental Reach % (1) and ascending incremental OT CPM (2) as it is likely that multiple properties with the same relative incremental reach % will exist. The 1st row is Property 1 and is not considered for the recursive analysis: For example, the result may be as illustrated in FIG. 2L.

In one example, the building of the X-Screen plan of Use Case 2 is continued as follows:

| Use Case 2: New PTV, Desktop, Phone & Tablet Plan (from scratch) | |
|---|---|
| Building the XScreen plan | 2. Building the Phone and Tablet App list generating the least expensive On-Target % for the target demo considering the % of budget going to Phone + Tablet:<br>a. Considering the Target demo, obtain from "BrandPoint Mobile" the list of Phone and Tablet apps ordered by ascending OT CPM.<br>b. Run down the list until the Phone and Tablet budgets are met.<br>c. The Incremental Reach for Phone + Tablet is the Mobile Reach # * (Desktop-Mobile unduplicated reach factor based on, for example, Comscore)<br>The Desktop-Mobile unduplicated reach factor would be per demo. As an instance, using Comscore top 100 multiplatform report unduplicated Desktop-Mobile. |

The results obtained after step 2(a) may be, for example, the list of applications as illustrated in FIG. 2M.

In one example, the Use Case 2 may also include a case when the users update the suggested media mix. Accordingly, the process according to one embodiment to address this update is as follows:

| Use Case 2: New PTV, Desktop, Phone & Tablet Plan (from scratch) - Use cases when users update the suggested Media Mix: | |
|---|---|
| Budget Update: | 1. User lowers budget for Phone and/or Tablet:<br>reallocate budget to the [PTV + Desktop] and run the full analysis. In this case, the user dictates the % Budget split<br>2. User lowers budget for PTV:<br>reallocate the budget to Desktop (subcase: all of the budget will be reallocated to Desktop if the budget left by the user for PTV is not allowing tbuy the minimum block from a Supply Side Partner)<br>3. User lowers budget for Desktop:<br>reallocate the budget to PTV.<br>4. User increases budget for PTV:<br>reduces budget for Desktop (going down the same recursive approach until one or the other budget is met and then only consider properties from the screen with remaining budget)<br>5. User increases budget for Desktop:<br>reduces budget for PTV (going down the same recursive approach until one or the other budget is met and then only consider properties from the screen with remaining budget)<br>6. User increases budget for Phone and/or Tablet:<br>decreases budget for [PTV + Desktop] block redoing the recursive approach and may end up with no PTV if the budgets to buy a block are not met. |
| Property list Update | The principle is to redistribute the "removed" budgets within the same screen and among the existing properties by increasing the budgets allocated to them. |
| Impression Update | The same as for a property list update. The principle is to redistribute the impressions within the same screen and among the existing properties by increasing/decreasing the budgets allocated to them. |

In another use case is discussed in the following table:

| Use Case 3: Extend (Historical) TV Base Plan | |
|---|---|
| Inputs: | (Incremental) Budget, Start & End Dates, Target demographic, and Brand. The users shall be able to select one or multiple brands (actually Brand codes). |

| | |
|---|---|
| | Use Case 3: Extend (Historical) TV Base Plan |
| Outputs: | Property list which is a combination of TV Network/Day/ Daypart (PTV), Desktop Site, Phone and Tablet Applications Incremental reach % (complementing the TV Base Plan), and Unduplicated reach (considering TV Historical Plan, PTV, Desktop, Phone, and Tablet) |
| High level methodology: | In some embodiments, managed in the same way as Use Case 1. |
| Building the XScreen plan | In some embodiments, managed in the same way as Use Case 1. |

FIGS. 3-10 and 14 illustrate screen shot examples of a user interface that may be used with the system for executing an advertising campaign that incrementally reaches unexposed target viewers in accordance with one embodiment. In one embodiment, the user interface is displayed on an advertiser client or user's 116 electronic device that is communicatively coupled to the DSP 114. In another embodiment, a user may be associated specifically with DSP 114 and operate the user interface to perform any or all of planning, analysis, and execution on behalf of an advertiser client 116 either collaboratively or in a proxy fashion. In general, regarding operation of the User Interface, when a user enters or changes any settable parameters on any page of the User Interface such as shown in FIGS. 3-10 and 14, programming operating at, or supplied by, the DSP 114 immediately and automatically responds by determining one or more results, and by signaling to the user interface to graphically display the one or more results, as discussed above.

In some embodiments, an operator associated with the DSP 114 may interact with the one or more servers 112 via an operator's electronic device in order to control or affect the operations of the DSP 114. In some embodiments, the DSP 114 may be included on the advertiser client or user's 116 electronic device. In this embodiment, the processor included on the advertiser client or user's 116 electronic device may execute instructions stored in a non-tangible storage device included on the advertiser client or user's 116 electronic device that cause the processor of the advertiser client or user's 116 electronic device to perform the operations of the DSP 114. In some embodiments, the DSP 114's response time to update the results during the bidding process as well as based on the user's changes in the user interface and signal the display of the one or more results allows for the bidding process to be optimized as discussed above. Further, the response time of the DSP 114 is necessary for user interface usability. For example, in response to a user changing the settable parameters on the user interface, the response time of the DSP 114 to update the results to be displayed to the user is important to acceptable interaction with the user.

FIG. 3 is a screen shot example of a user interface that may be used to plan a cross screen campaign, in accordance with some embodiments. For example, FIG. 3 shows the setting up of campaign goals, demographic (demo) targeting, strategic targeting, and TV plan analysis, in accordance with some embodiments. Specifically, as shown in FIG. 3, campaign goals or goal parameters 302 can be set up, for example, by selecting a region 304, budget 306, and run dates from start date 308 to end date 310, for the campaign. Further, demo targeting 312 may be set up, for example, by selecting gender 314 and age 316, for example using a double slider bar 318, to enable users to set lower and upper age bracket boundaries. Further, strategic segment targeting 320 can be set up, for example, using historic 3rd party (Nielsen data) 322 and/or MRI segments (segments defined by Mediamark Research and Intelligence) 324, or strategic targeting defined by other market research organizations. Optionally, an existing TV plan analysis 326 may be performed, by uploading an existing plan for analysis, for example using historic 3rd party (Nielsen data), a template, an existing plan, or no plan 328.

Figure 4:
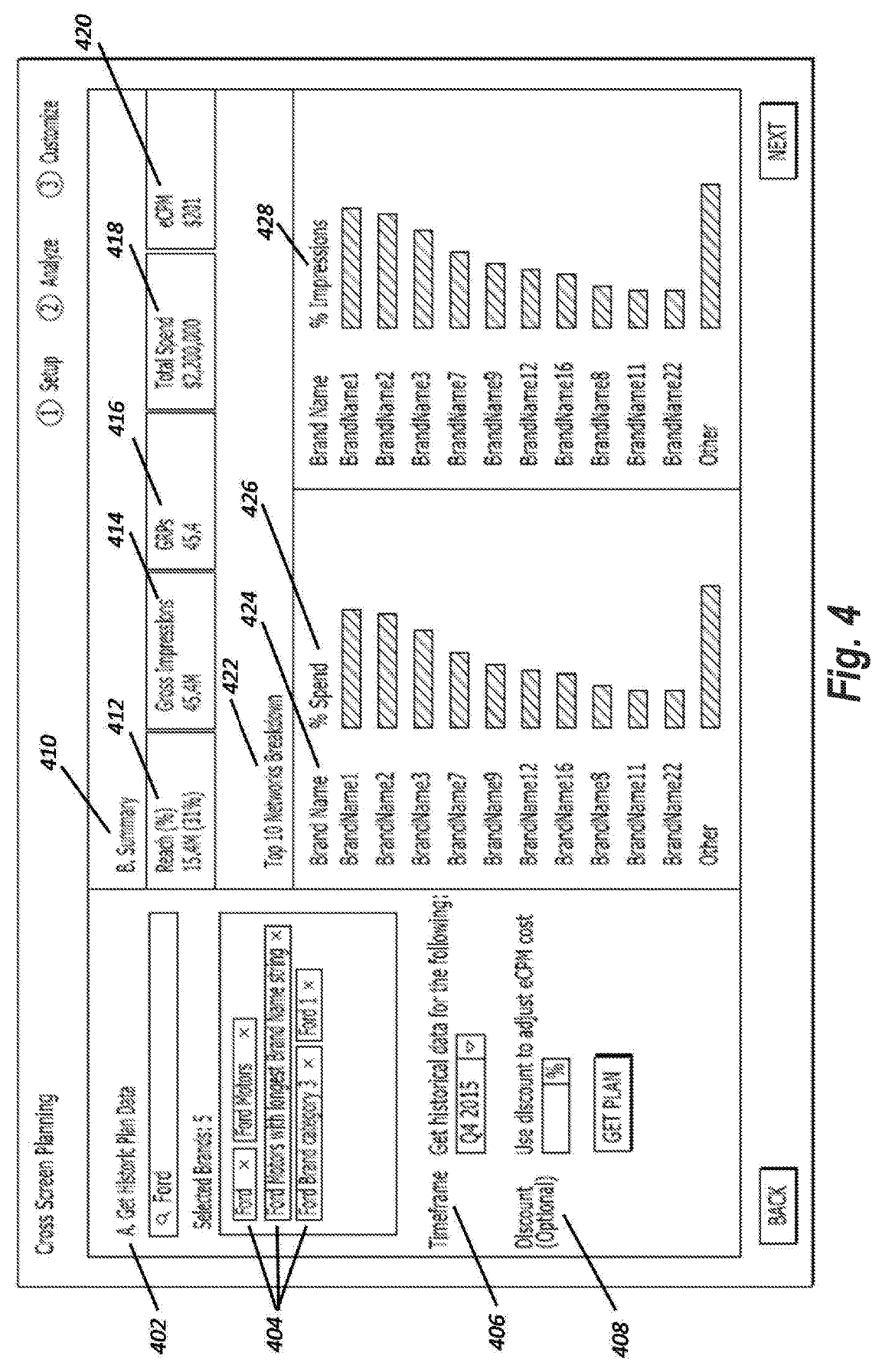

FIG. 4 is a screen shot example of a user interface that may be used to plan or manage a cross screen campaign and showing the entering of historic plan data, in accordance with some embodiments. To load campaign data from a historical plan at 402, a primary Brand is entered, for example: "Ford", and sub-brands may be selected if available, at 404. The timeframe 406 for retrieving the historical data is chosen, and optionally a discount 408 may be set to adjust CPM cost. A summary 410 is then presented to the user for the historical plan, including, for example, reach 412, gross impressions 414, Gross Rating Points (GRPs) 416, total spend 418, and effective cost per thousand impressions (eCPM) 420. In the shown example, the top 10 networks 422 for the campaign are also shown in descending order according to impressions delivered. As can be seen, the information displayed may include a list of Brand names 424 and associated % of spending 426. In a second section, the information displayed may include a list of Brand names and associated % of impressions 428.

Figure 5:
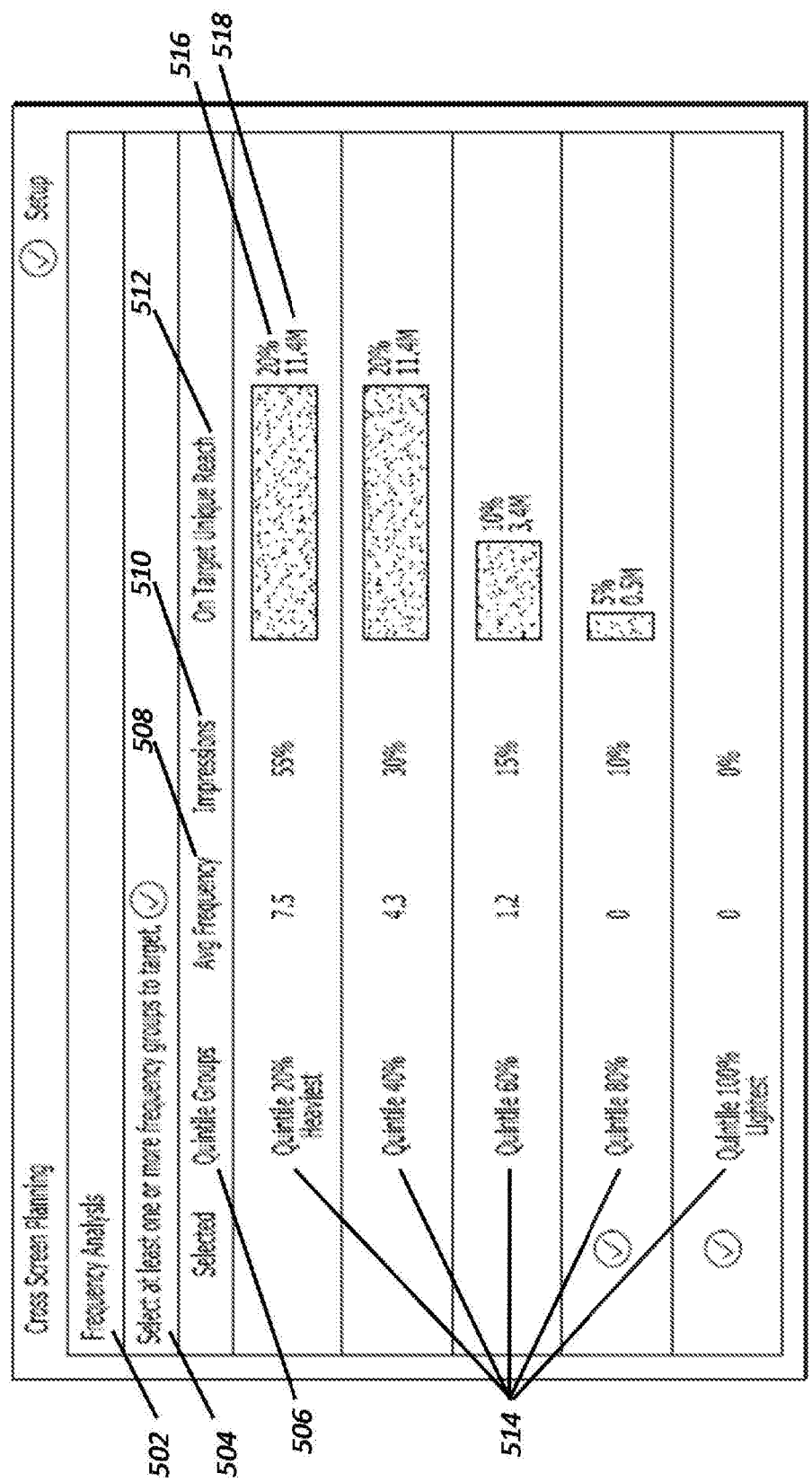

FIG. 5 is a screen shot example of a user interface that may be used to plan a cross screen campaign and showing a frequency analysis for a historic plan, in accordance with some embodiments. The frequency analysis 502 as shown in FIG. 5 may initially be filtered by selecting one or more frequency groups to target, at 504. In the example provided, information may be organized by quintile group 506, for example using quintile percentages 514 of listed items, average frequency 508, impressions 510, and on target unique reach 512. As further shown in FIG. 5, horizontal bar graphs representing on-target unique reach may help graphically display selected data, such as reach percentage 516 and on-target impressions 518, and the planning data is organized according to impressions delivered in descending order.

Figure 6:
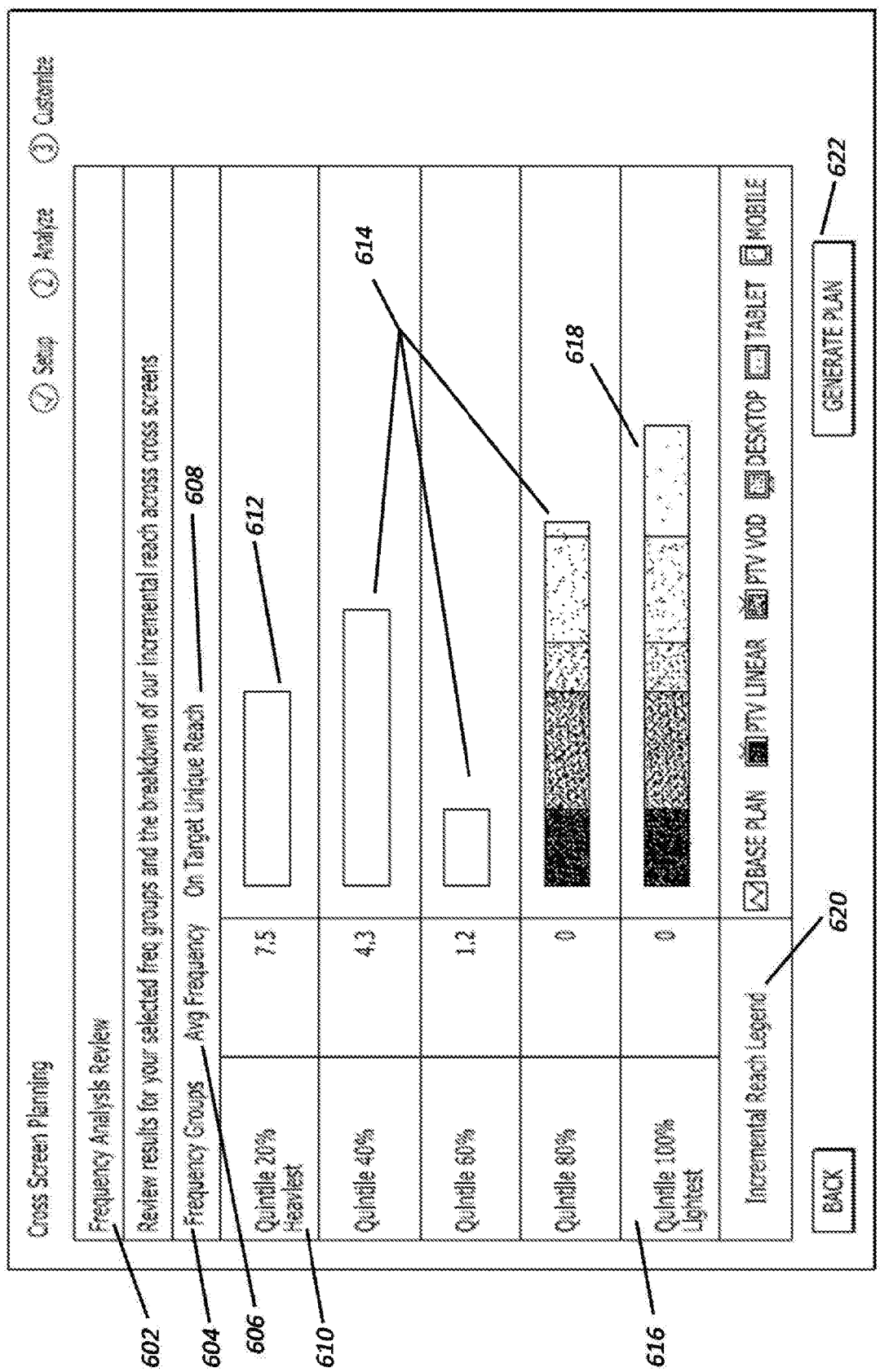

FIG. 6 is a screen shot example of a user interface that may be used to plan a cross screen campaign and showing a frequency analysis review 602 in accordance with some embodiments. Further detail related to the frequency analysis of FIG. 5 is shown in FIG. 6, where for each frequency group 604, the respective quintiles are shown, from the heaviest quintile percentage 610 to the lightest quintile percentage 616. For each frequency group, the average frequency 606 is shown, as well as the on-target unique reach 608. As shown in FIG. 6, the on-target unique reach can be broken down according to target screen type, for example by with horizontal segmented bar graphs 612, 614, and 618, wherein each segment of a bar graph indicates a percentage of on target unique reach for that quintile associated with each of PTV Linear, PTV VOD, desktop, tablet, and mobile screen types. Further, at 620, a legend is provided for helping understand the On Target Unique Reach indicated by the segmented bar graphs 612, 614, and 618. At 622, a button may be pressed to generate a cross screen plan.

Figure 7:
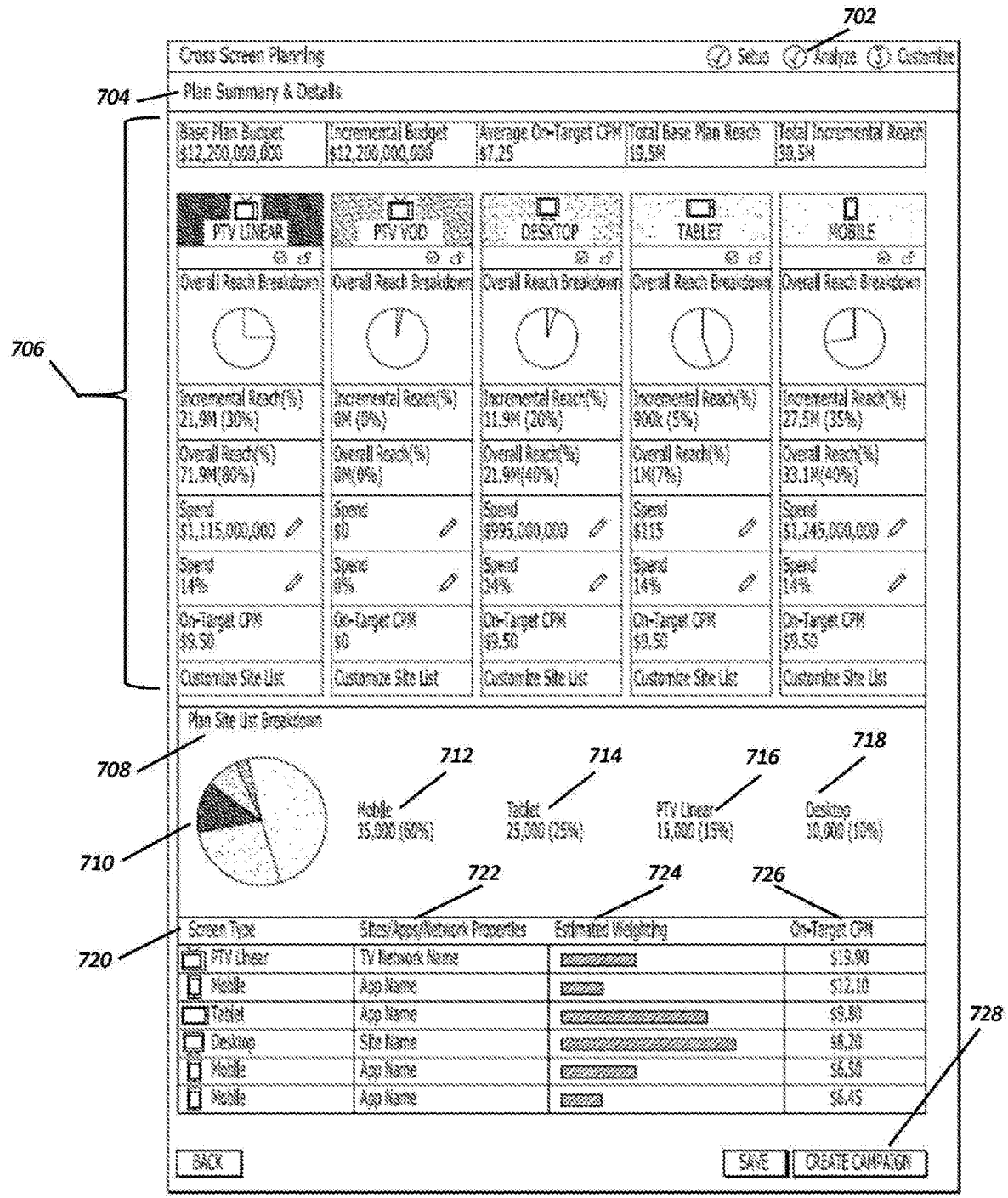

FIG. 7 is a screen shot example of a user interface that may be used to analyze a cross screen campaign 702, by displaying a summary of a plan and its details 704, to help a user review a cross screen campaign, in accordance with some embodiments. An example of a breakdown summary for a cross screen plan is shown at 706, and includes for each target screen type details for incremental reach, overall reach, spend, spend percentage, and on-target CPM. A site list breakdown is also shown and includes estimated weighting and on-target CPM for each screen type. Further, a plan site list breakdown 708 may be provided, showing a pie chart of the plan site list breakdown. For example, pie chart slice 710 is associated with the PTV linear part of the whole plan. Further, the numbers and percentages may be provided for each screen type, for example, for Mobile 712, Tablet 714, PTV linear 716 and Desktop 718. Further, a table of information may be provided, to show, for example, screen type 720 as correlated with Sites/Apps/Network Properties 722, estimated weighting 724, and On Target CPM 726. At 728, a button may be pressed to create a cross screen campaign.

Figure 8:
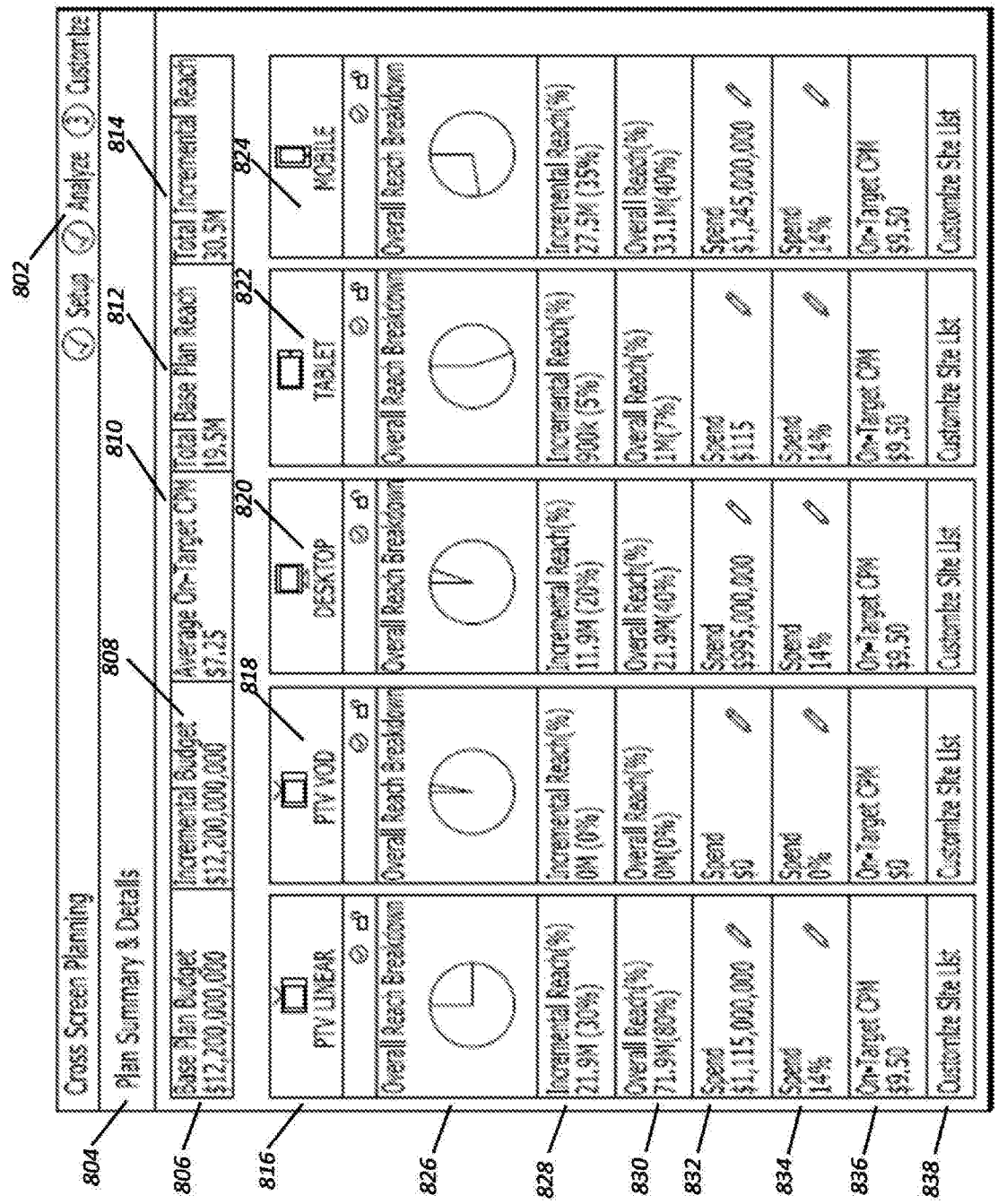

FIG. 8 is a further screen shot example showing additional detail for portion 706 of the user-interface display of FIG. 7. As part of the campaign analysis 802, plan summary and details 804 is provided in FIG. 8, to help a user review a cross screen campaign, in accordance with some embodiments. FIG. 8 illustrates a focus on results breakdown 706, and further shows in a table, plan summaries for Base Plan Budget 806, Incremental Budget 808, Average on Target CPM 810, Total Base Plan Reach 812, and Total Incremental Reach 814. Further details including Overall Reach Breakdown 826, Incremental Reach % 828, Overall Reach % 830, Spend amount 834, On Target CPM 836, and Customize Site List 838, are shown for each of the screen types, including PTV Linear 816, PV VOD 818, Desktop 820, Tablet 822 and Mobile 824. Further, where overall reach breakdown 826 is shown for each screen type, a pie chart graphic is also shown.

Figure 9:
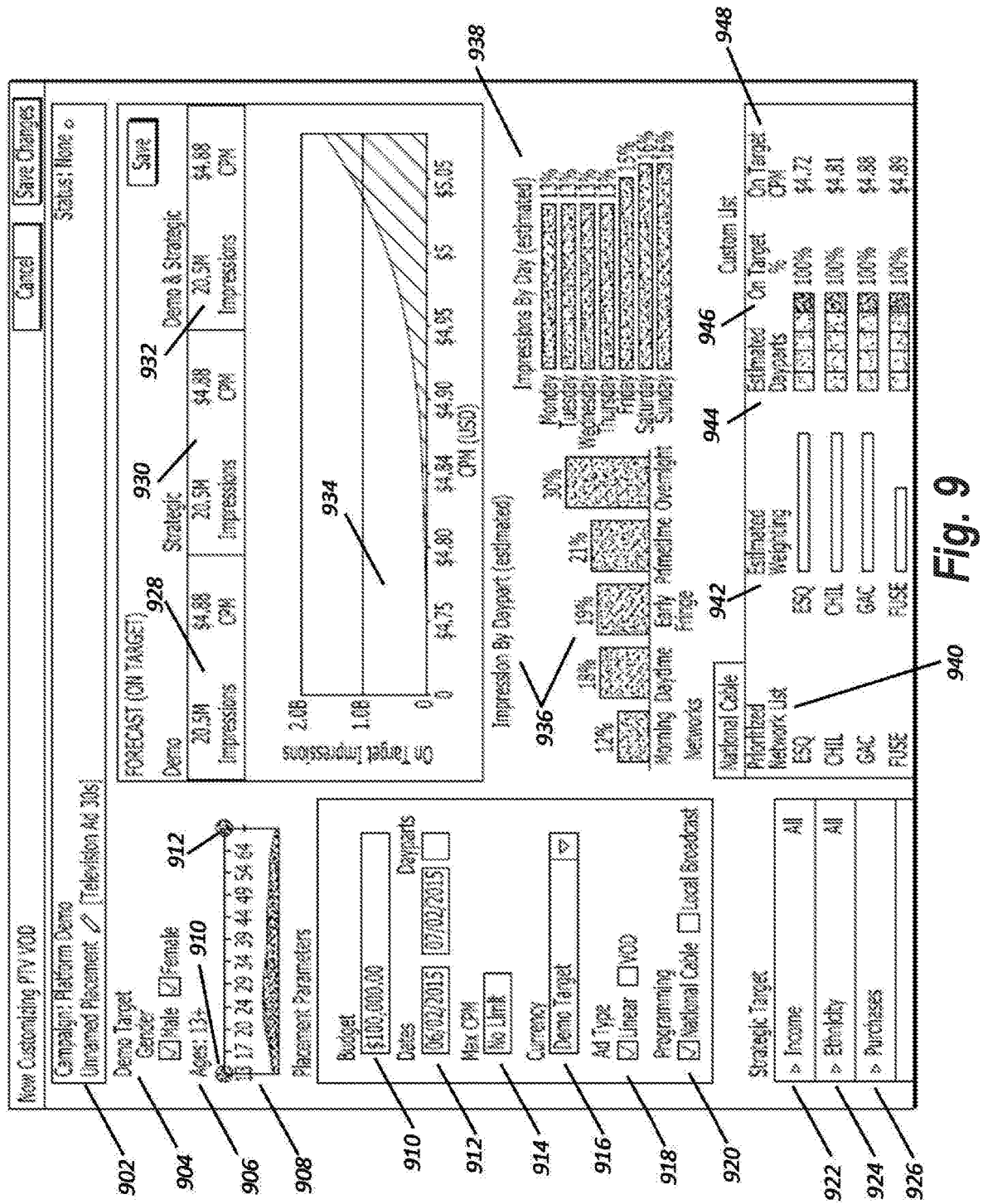

FIG. 9 is a screen shot example of a user interface that may be used to view impression forecasts for a cross screen campaign, in accordance with some embodiments. The user interface of FIG. 9 enables a user to interactively change demo and strategic targeting parameters as well as budget, campaign dates and targeted dayparts. Accordingly, an ad type can be specified, which may be linear, VOD, or both, as well as choosing national cable and/or local broadcast programming. As shown in FIG. 9, the user may manipulate a specific campaign at 902, by selecting demographic target data 904, such as gender and ages 906, optionally using a sliding scale 908, where two positionable sliding nodes are positioned by a user to indicate minimum age 910 to maximum age 912. Further, the user may manipulate placement parameters and targeting parameters, for example, by entering or selecting budget amount 910, start and end dates 912, Max CPM 914, Currency 916, Ad Type 918, Programming type 920. Elements of strategic targeting may also be selected, including for example and not limited to Income 922, Ethnicity 924 and Purchases data 926. A forecast summary table is presented at the upper right of FIG. 9 and may include for example on-target impressions and CPM cost with respect to demographic targets only, strategic targets only, or demo and strategic targets combined. A graph 934 of estimated on-target impressions relative to CPM is shown. Estimated impressions by daypart 936 are shown for five example dayparts as well as estimated impressions by day 938. Finally, estimated on-target results are shown for each targeted network, as per network list 940, including estimated network weighting 942 and estimated dayparts 944, as well as showing custom lists for On Target % 946 and On Target CPM 948.

Figure 10:
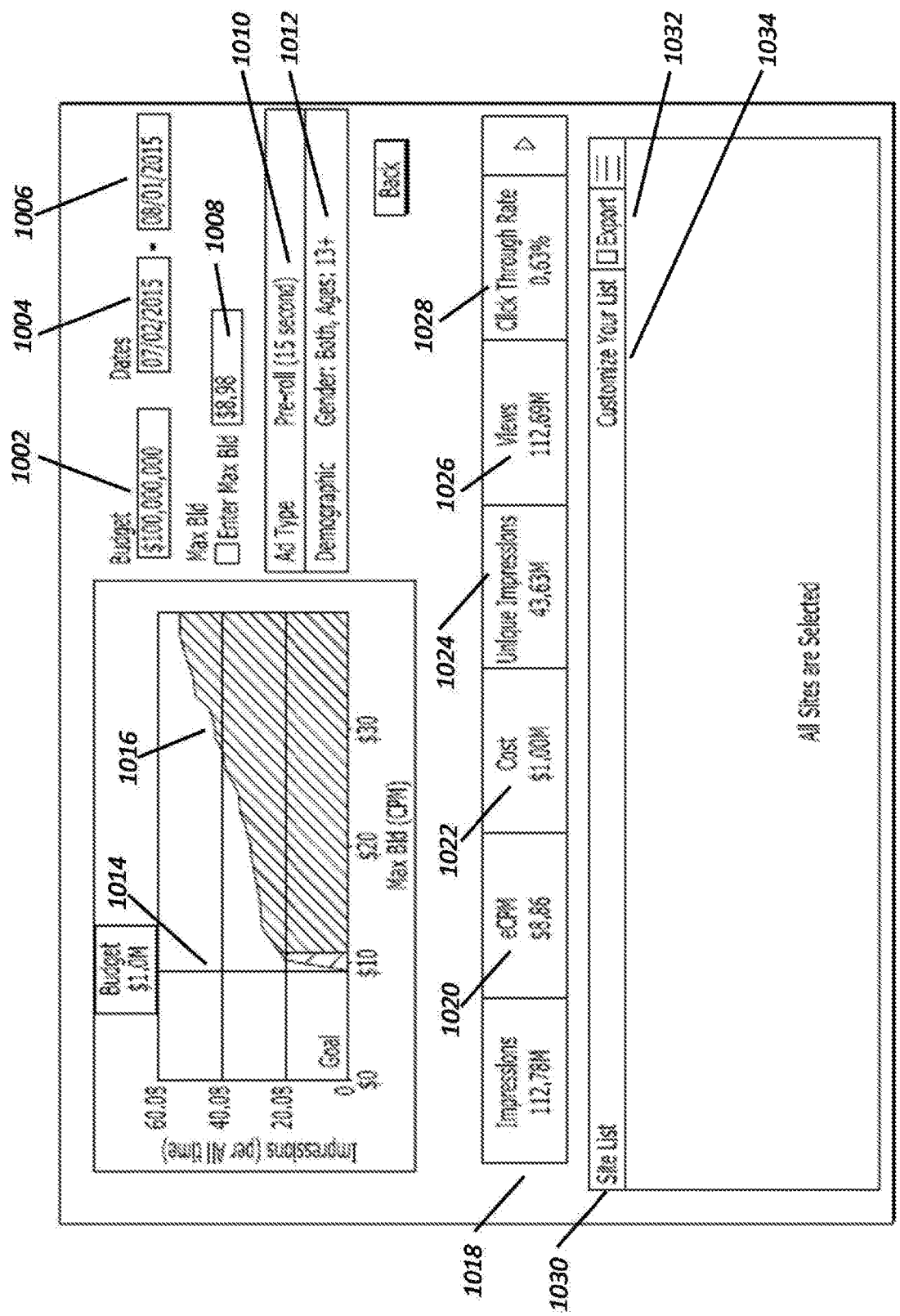

FIG. 10 is a screen shot example of a user interface that is used to define a budget at 1002, a start date at 1004 and a finish date at 1006 for a campaign, in accordance with some embodiments. As shown in FIG. 10, a user may enter a maximum bid at 1008 for an Ad Type at 1010, with targeted Demographics at 1012. A graph in the upper left corner of FIG. 10 shows how estimated impressions 1016 vary for different values of Maximum Bid. A vertical line 1014 indicates a budget for the campaign. The user may also review the forecasted results for a cross screen campaign using the summary table of campaign data, including Impressions 1018, effective cost per thousand impressions (eCPM) 1020, Total Cost 1022, Unique Impressions 1024, Views 1026, and Click Through Rate 1028 etc. Additionally, a site list 1030 may be provided, allowing for a user to customize their targeted site list at 1034, and optionally export site data using option 1032.

Figure 11:
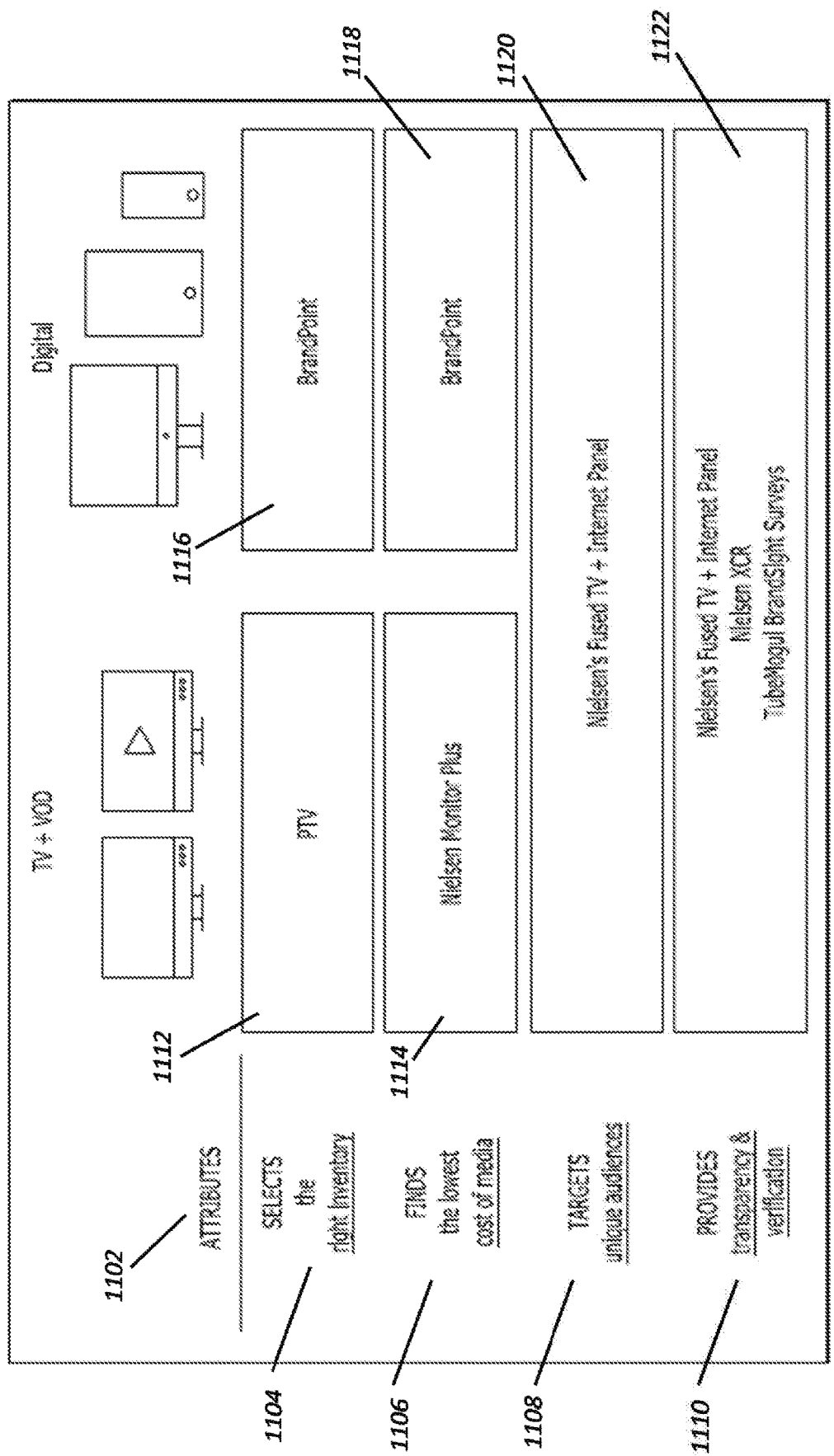
FIG. 11 illustrates an exemplary display on a user interface that includes system tools for enabling planning of a cross screen campaign, in accordance with some embodiments.

FIG. 11 illustrates an exemplary display on a user interface that includes system tools for enabling planning of a cross screen campaign, in accordance with some embodiments. Tools provided by both a demand-side platform (e.g., PTV and BrandPoint) and a third-party data provider (e.g., Nielsen Monitor Plus) are used to plan a cross screen campaign as per selected attributes 1102. For example, the user can select the right inventory at 1104 using tools such as PTV 1112 and BrandPoint 1116, and find the lowest cost of media at 1106 using tools such as for example Nielsen Monitor 1114 and BrandPoint 1118. The user can then select targets for unique audiences at 1108 using third-party attribution data 1120 such as Nielsen's fused TV data as well as Internet panel data. To achieve transparency and verification 1110, some combination 1122 of Nielson Fused TV, Internet Panel, Nielson XCR, and TubeMogul BrandSight Surveys is utilized at 1122.

Figure 12:
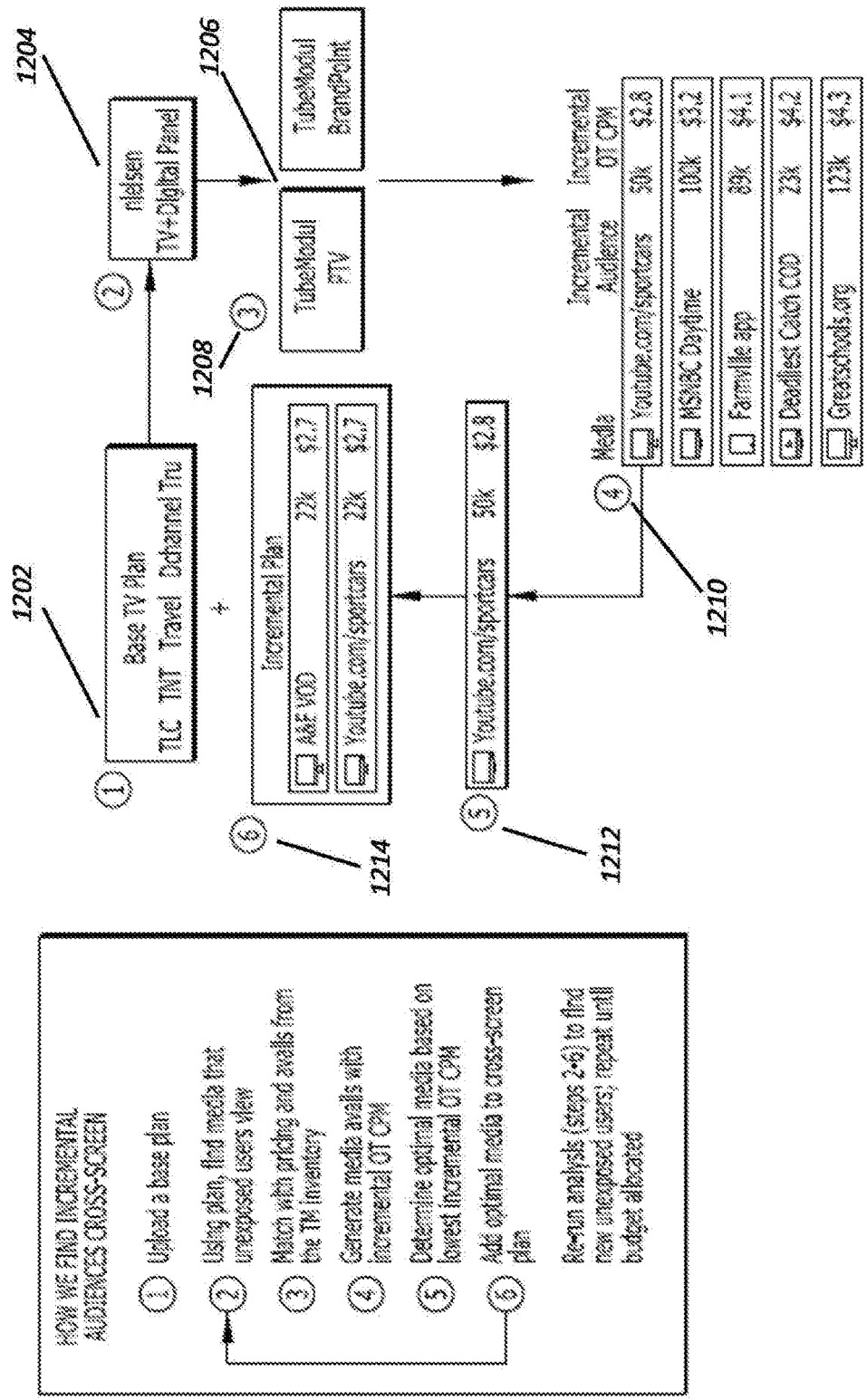
FIG. 12 illustrates an example of a workflow for executing an advertising campaign that incrementally reaches unexposed target viewers in accordance with one embodiment.

FIG. 12 illustrates an example of a workflow for executing an advertising campaign that incrementally reaches unexposed target viewers in accordance with one embodiment. As shown in FIG. 12, an example of a work flow also enables calculating an optimal incremental cross screen plan in accordance with some embodiments. The workflow may be operated in the following sequence. The workflow starts, at step 1, where a base plan is uploaded (1202). In step 2, the base plan is used to find media that unexposed viewers view (1204). In step 3, located media is matched with pricing and avails from the inventory at the DSP (e.g. TubeMogul) (1208), which includes (1206) both PTV and online avails. In step 4, media avails are generated along with statistics for an incremental audience and incremental OT CPM, (1210). In step 5, optimal media based on lowest incremental OT CPM is determined, (1212), for example, from Youtube.com channels. In step 6, optimal media is added to the cross screen plan, (1214).

Subsequently, the analysis of steps 2 (1204) through 6 (1214) is rerun (or looped) in sequence to find new unexposed viewers. Each time the steps are rerun, the optimal media based on next-lowest incremental OT CPM is determined. The process is then repeated until a defined budget has been allocated.

Figure 13:
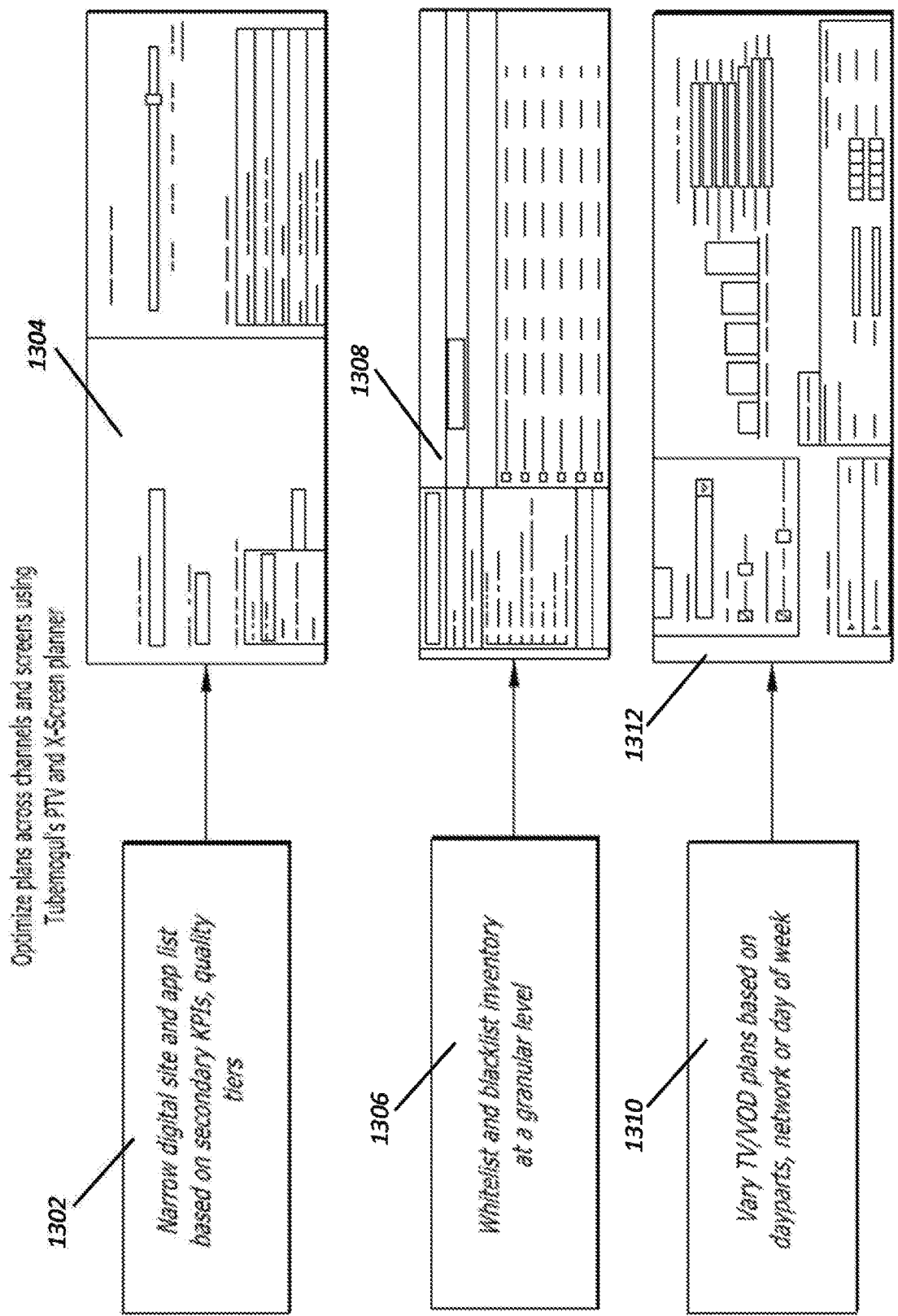
FIG. 13 illustrates use scenarios for planning of campaigns using a programmatic television (PTV) and cross screen tools in accordance with one embodiment.

FIG. 13 illustrates use scenarios for planning of campaigns using a programmatic television (PTV) and cross screen tools in accordance with one embodiment. For example, lists of digital sites and apps may be narrowed based on secondary KPIs (Key Performance Indicators) and quality tiers, at 1302. Inventory may be white listed or blacklisted at a granular level, at 1306. Also, TV and VOD plans can be varied based on dayparts, network, or day of the week, at 1310. The respective interfaces 1304, 1308 and 1312 may be used to display the selected criterion.

Figure 14:
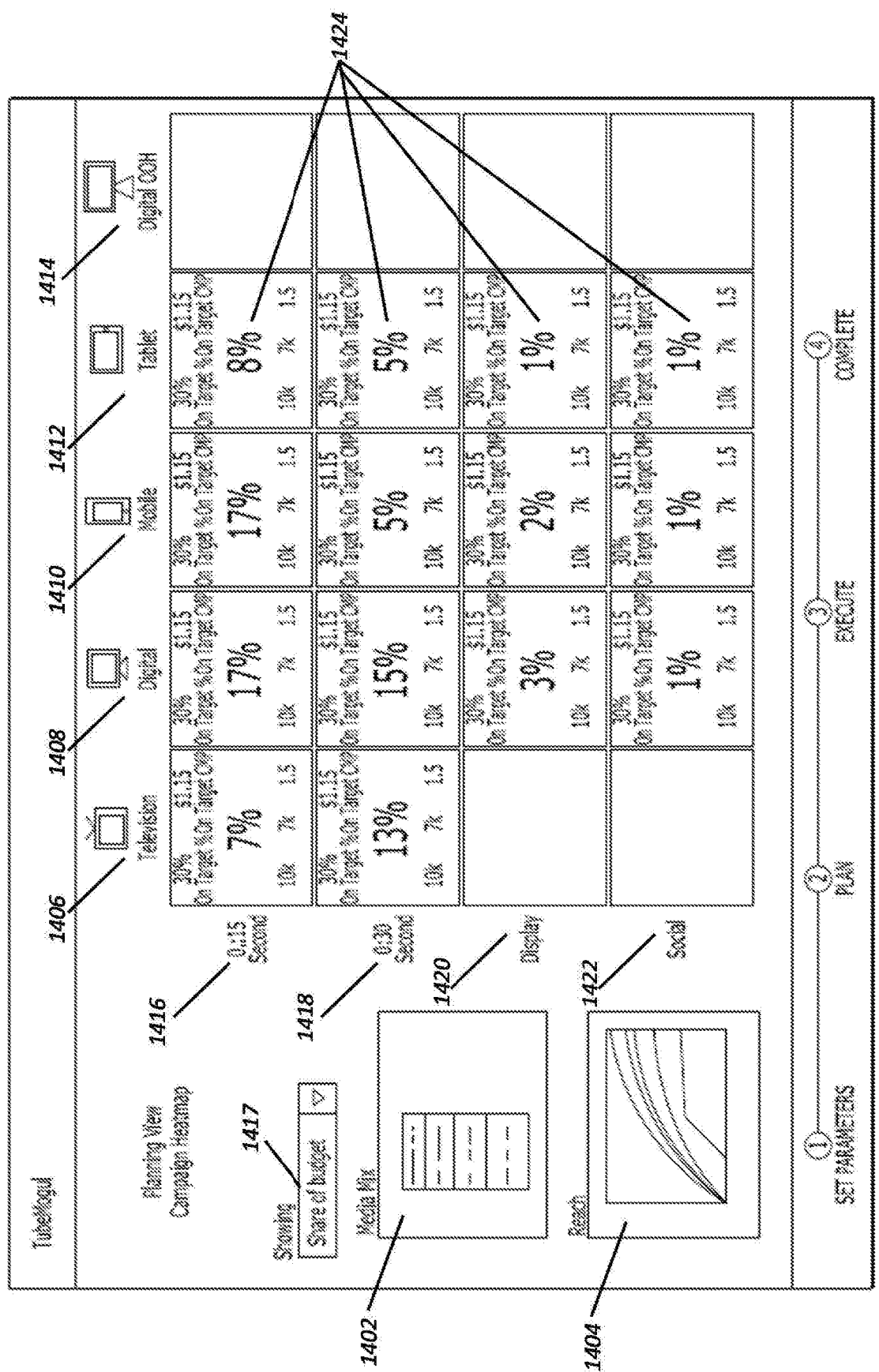
FIG. 14 is a screen shot example of a user interface that may be used with the system for executing an advertising campaign that incrementally reaches unexposed target viewers in accordance with one embodiment.

FIG. 14 is a screen shot example of a user interface that may be used with the system for executing an advertising campaign that incrementally reaches unexposed target viewers in accordance with one embodiment. As shown in FIG. 14, the user interface may show a dynamically optimized cross screen campaign heat map, in accordance with some embodiments. In the exemplary display of FIG. 14, a share of budget is shown for each screen type under different assumptions. For example, a user may select the share of budget for showing, at 1417, the media mix required at 1402, and the reach required at 1404, for different screen types, such as Television 1406, Digital 1408, Mobile 1410, Tablet 1412 and Digital OOH Out-of-Home) at 1414. The heat map may further show the shares of the budget at 1424, for time intervals, such as 15 seconds at 1416, 30 seconds at 1418, for the respective screen types, as well as the Display data at 1420 and Social Media data 1422, for the respective device types.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A system for executing an advertising campaign that incrementally reaches unexposed target viewers comprising:
a demand-side platform, including one or more processors, the demand-side platform having access to a total campaign budget for an advertising campaign, and demographic and strategic segment targeting parameters for the advertising campaign, wherein the demand-side platform causes the system to:
generate a first result including a list of media properties, a list of on-target unexposed unique viewers that are within targeted demographic and strategic segments;
generate a second result including a list of media properties visited by the on-target unexposed unique viewers and an incremental on-target cost-per-impression based on historical data for each media property in the list of media properties visited by the on-target unexposed unique viewers;
generate a third result including a list of media properties, selected from the first and second results, that include media properties having a lowest incremental on-target cost-per-impression, and having a total of budgets equal to a specified percentage over the total campaign budget;
generate a fourth result including a list of media properties including media properties from the lists of media properties in the first and second results that are not included in the list of media properties in the third result;
repeat selecting a media property from the fourth result having the highest relative incremental reach, and including the selected media property in the list of media properties of the third result until a sum of the budgets associated with the media properties on the list of media properties of the third result equals the total campaign budget; and
signal to a user interface to graphically display a cross screen plan summary comprising, for each of a plurality of screen types, a graphical representation of a screen-specific plan breakdown based on one or more of the first result, the second result, the third result, or the fourth result.

2. The system in claim 1, wherein the advertising campaign is automatically executed for online targeted viewers by the demand-side platform, wherein the demand-side platform automatically executes the advertising campaign by:
receiving via a network an ad slot opportunity from a supply side partner operating on a remote server,
determining a bidding response to the ad slot opportunity, and
placing the bidding response via the network to the supply side partner within 200 milliseconds of receiving the ad slot opportunity.

3. The system of claim 2, wherein the demand-side platform further generates an incremental factor representing a probability that an unexposed viewer will be reached on a given media property and at a given time, the incremental factor being equal to a total number of unexposed on-target viewers divided by a total number of viewers contained in a fused database of historical data for TV viewing and online viewing.

4. The system of claim 3, wherein the demand-side platform further generates, for each Network, Day, and Daypart, a uniqueness screen factor comprising a difficulty factor for generating unique reach on the Network, wherein the uniqueness screen factor is determined by analyzing results for a historical campaign and comparing the results for a plurality of consecutive time periods.

5. The system of claim 4, wherein the incremental on-target cost-per-impression is determined by dividing on-target cost-per-impression by a product of the incremental factor and the uniqueness screen factor.

6. The system of claim 4, wherein the total campaign budget is determined to be 0.001 times a product of:
an on-target percentage;
a number of available impressions for a time period between a campaign start date and a campaign end date; and
an on-target cost-per-impression.

7. A system for executing an advertising campaign that incrementally reaches unexposed target viewers comprising:
a demand-side platform, including one or more processors, the demand-side platform having access to a total budget for an advertising campaign, and demographic and strategic segment targeting parameters for the advertising campaign, wherein the demand-side platform causes the system to:

generate a list of media properties by:
automatically generating a first list of media properties reflecting both TV viewing and online viewing, wherein the first list of media properties is based on identified on-target unexposed unique viewers with respect to a TV base plan as well as online media properties visited by identified on-target unexposed unique viewers,
automatically truncating the first list to generate a truncated first list including media properties having a lowest incremental on-target cost-per-impression, and having a total of budgets equal a specified percentage over a total campaign budget,
automatically generating a second list of media properties that represent a new plan for the advertising campaign that provides incremental reach beyond that of the TV base plan, wherein automatically generating the second list of media properties includes: initially including, in the second list, media properties listed in the TV base plan; for each media property in the truncated first list, automatically determining a relative incremental reach compared to the media properties in the second list, and automatically repeatedly moving a media property in the truncated first list having a highest relative incremental reach from the truncated first list to the second list until a sum of the budgets associated with the media properties on the truncated first list equals the total campaign budget; and
signal to a user interface to graphically display a cross screen plan summary comprising, for each of a plurality of screen types, a graphical representation of a screen-specific plan breakdown based on one or more of the first list, the truncated first list, or the second list.

8. The system of claim 7, wherein the advertising campaign is automatically executed for online targeted viewers by the demand-side platform, wherein the demand-side platform automatically executes the advertising campaign by:
receiving via a network an ad slot opportunity from a supply side partner operating on a remote server;
determining a bidding response to the ad slot opportunity; and
placing the bidding response via the network to the supply side partner within 200 milliseconds of receiving the ad slot opportunity.

9. The system of claim 8, wherein the first list of media properties is sorted by ascending incremental on-target cost-per-impression, wherein the demand-side platform generates the first list by merging two lists comprising:
(1) a list of Network, Day, and Daypart watched by the on-target unexposed unique viewers; and
(2) a list of media properties visited by the on-target unexposed unique viewers.

10. The system of claim 9, wherein the demand-side platform further generates an incremental factor representing a probability that an unexposed viewer will be reached on a given media property and at a given time, the incremental factor being equal to a total number of unexposed on-target viewers divided by a total number of viewers contained in a fused database.

11. The system of claim 10, wherein the demand-side platform further generates, for each Network, Day, and Daypart, a uniqueness screen factor comprising a difficulty factor for generating unique reach on the Network, wherein the uniqueness screen factor is determined by analyzing results for a historical campaign and comparing the results for a plurality of consecutive time periods.

12. The system of claim 11, wherein the incremental on-target cost-per-impression is determined by dividing on-target cost-per-impression by a product of the incremental factor and the uniqueness screen factor.

13. The system of claim 12, wherein the total campaign budget is determined to be 0.001 times a product of:
an on-target percentage;
a number of available impressions for a time period between a campaign start date and a campaign end date; and
an on-target cost-per-impression.

14. A method of executing an advertising campaign that incrementally reaches unexposed target viewers comprising:
generating, by a demand-side platform, a first result including a list of media properties, a list of on-target unexposed unique viewers that are within targeted demographic and strategic segments;
generating, by the demand-side platform, a second result including a list of media properties visited by the on-target unexposed unique viewers and an incremental on-target cost-per-impression based on historical data for each media property in the list of media properties visited by the on-target unexposed unique viewers;
generating, by the demand-side platform, a third result including a list of media properties, selected from the first and second results, that include media properties having a lowest incremental on-target cost-per-impression, and having a total of budgets equal to a specified percentage over a total campaign budget;
generating, by the demand-side platform, a fourth result including a list of media properties including media properties from the lists of media properties in the first and second results that are not included in the list of media properties in the third result;
repeatedly selecting, by the demand-side platform, a media property from the fourth result having the highest relative incremental reach, and including the selected media property in the list of media properties of the third result until a sum of the budgets associated with the media properties on the list of media properties of the third result equals the total campaign budget; and
signaling to a user interface to graphically display a cross screen plan summary comprising, for each of a plurality of screen types, a graphical representation of a screen-specific plan breakdown based on one or more of the first result, the second result, the third result, or the fourth result.

15. The method in claim 14, further comprising:
receiving via a network, an ad slot opportunity from a supply side partner operating on a remote server;
determining a bidding response to the ad slot opportunity; and
placing the bidding response via the network to the supply side partner within 200 milliseconds of receiving the ad slot opportunity.

16. The method of claim 15, further comprising sorting the first list of media properties is by ascending incremental on-target cost-per-impression and generating the first list of media properties by merging two lists comprising:
(1) a list of Network, Day, and Daypart watched by the on-target unexposed unique viewers; and
(2) a list of media properties visited by the on-target unexposed unique viewers.

17. The method of claim 16, further comprising generating an incremental factor representing a probability that an unexposed viewer will be reached on a given media property and at a given time, the incremental factor being equal to a total number of unexposed on-target viewers divided by a total number of viewers contained in a fused database.

18. The method of claim 17, further comprising generating, for each TV Network, Day, and Daypart, a uniqueness screen factor comprising a difficulty factor for generating unique reach on the Network, wherein the uniqueness screen factor is determined by analyzing results for a historical campaign and comparing the results for a plurality of consecutive time periods.

19. The method of claim 18, further comprising determining the incremental on-target cost-per-impression by dividing on-target cost-per-impression by a product of the incremental factor and the uniqueness screen factor.

20. The method of claim 19, further comprising truncating the first list before moving media properties from the first list to the second list, and selecting the first media property from the truncated first list of media properties based on having a lowest incremental on-target cost-per-impression.

\* \* \* \* \*